(12) United States Patent
Fujiwara

(10) Patent No.: US 7,701,452 B2
(45) Date of Patent: Apr. 20, 2010

(54) INPUT SOURCE SEARCH SUPPORT METHOD, AND IMAGE DISPLAY APPARATUS AND PROJECTOR USING THE SEARCH SUPPORT METHOD

(75) Inventor: Shuichi Fujiwara, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 1070 days.

(21) Appl. No.: 11/368,399

(22) Filed: Mar. 7, 2006

(65) Prior Publication Data

US 2006/0203133 A1 Sep. 14, 2006

(30) Foreign Application Priority Data

Mar. 8, 2005 (JP) ............................. 2005-063485
May 9, 2005 (JP) ............................. 2005-135636

(51) Int. Cl.
G09G 5/00 (2006.01)
(52) U.S. Cl. ........................ 345/204; 345/690; 345/55
(58) Field of Classification Search ................. 345/204, 345/690, 55
See application file for complete search history.

(56) References Cited

U.S. PATENT DOCUMENTS

2004/0141516 A1* 7/2004 Lee ............................. 370/428

(Continued)

FOREIGN PATENT DOCUMENTS

JP A-6-512729 2/1994

(Continued)

OTHER PUBLICATIONS

Epson Sales Japan Corporation, Seiko Epson Corporation; General catalog for business projector; Catalog code: CLELSG16A, Dec. 15, 2005 (with English translation).

*Primary Examiner*—Richard Hjerpe
*Assistant Examiner*—Leonid Shapiro
(74) *Attorney, Agent, or Firm*—Oliff & Berridge, PLC

(57) ABSTRACT

An image display apparatus for displaying an image produced by image signals on a display section includes: a plurality of input terminals for receiving each of the image signals supplied from a plurality of input sources; an input selector for selecting a predetermined input terminal from the plural input terminals; a judging section for determining whether the image signals have been inputted to the input terminal selected by the input selector; an operating section which receives requirement of search processing for determining whether the image signals have been inputted to each of the plural input terminals; an image signal correcting section which generates image signals for producing a source search screen indicating search status for each of the input source names corresponding to the input terminals; and a control section for displaying an image of the source search screen produced by the image signals at least on the display section in response to search processing executed through the operation section. The control section commands the input selector to sequentially select the input terminals when the search processing is required through the operation section, and commands the judging section to check the presence or absence of the image signals for each of the selected input terminals. The control section commands the image signal correcting section to add an indication that the image signals have not been inputted to any of the checked input terminals when the image signals have not been inputted thereto. The control section commands the image signal correcting section to close the source search screen when it is determined that the image signals have been inputted to any of the input terminals, and commands the display section to display an image produced by the image signals from the input terminal from which the image signals have been detected.

8 Claims, 13 Drawing Sheets

U.S. PATENT DOCUMENTS

| | | | |
|---|---|---|---|
| 2005/0018084 A1* | 1/2005 | Cho | 348/569 |
| 2005/0190303 A1* | 9/2005 | Kim et al. | 348/706 |

FOREIGN PATENT DOCUMENTS

| | | |
|---|---|---|
| JP | A-11-261918 | 9/1999 |
| JP | A-2000-41196 | 2/2000 |
| JP | A 2000-81666 | 3/2000 |

* cited by examiner

INPUT SOURCE SEARCH SUPPORT METHOD, AND IMAGE DISPLAY APPARATUS AND PROJECTOR USING THE SEARCH SUPPORT METHOD

BACKGROUND

1. Technical Field

The present invention relates to an input source search support method, and an image display apparatus and a projector using the search support method.

2. Related art

Generally, a plurality of input sources (e.g., image input devices such as PC, DVD and VTR, and the Internet) can be connected to a projector as an image display apparatus. FIG. 16 illustrates a related-art projector 500 to which a plurality of input sources are connected.

As illustrated in FIG. 16, the projector 500 produces image light corresponding to the desired input source of the plural input sources PC1, PC2, VTR, and DVD and projects the light on a screen S. Input/output interfaces used in the projector 500 in recent years are LAN (wireless or wire) interfaces, as well as input/output interfaces ($I_{computer1}$, $I_{computer2}$, $I_{video}$, $I_{s\text{-}video}$) shown in FIG. 16.

When this type of projector is used, a desired input source for providing projection display needs to be selected from available input sources. It is, therefore, convenient if information such as what input source of the plural input sources is available and what display it is providing can be easily obtained.

FIG. 17 shows a related-art input source search support method.

When input source switching command is inputted through a mode switch or a remote controller in the related-art input source search support method shown in FIG. 17, the next input source of the currently selected input source is stored in a flag of a RAM (step S940) to display the name of the input source stored in the RAM by OSD (step S941). Subsequently, switching signals requiring image signals to be outputted from the switched input source are outputted to an input switching device (step S942). After time-up of the timer (step S943), the OSD display is deleted (step S944). The input source is switched to another input source, in such a manner as from Video 1 to Video 2, Option, and other devices, for example, every time the input source switching command is inputted (for example, see JP-A-2000-081666).

In the related-art input source search support method, therefore, the input source is switched sequentially in accordance with the input source switching command inputted from the user. In this case, information such as what input source is available and what display is currently provided can be securely checked.

In the related-art input source search support method, however, processes required for this method are complicated and inconvenient since it is necessary to sequentially switch the input sources while checking whether or not available are input sources including input sources currently unavailable (such input sources as not powered or not connected with the projector). The problem will be more serious if a number of input sources can be connected with the projector as in the cases in recent years. Accordingly, another improved type of related-art image search support method capable of solving these problems has been proposed.

FIG. 18 shows the other improved type related-art input source search support method.

The related-art input source search support method shown in FIG. 18 automatically searches for the next input source by detecting image signals while skipping input sources currently unavailable if any, during search for the input source. In this input source search support method, therefore, the input sources currently unavailable which may be contained in the search target input sources are skipped and the next input source is automatically searched. In this case, it is unnecessary to sequentially switch the input sources while checking whether the input sources are available or not and the like. As a result, processes required for this method can be facilitated and thus the usability can be enhanced (for example, see General catalog for business projector ((Epson Sales Japan Corporation, Seiko Epson Corporation) catalog code: CLELSG16A (2004.12.15)) (page 3 (description of Automatic Detection of Image Signals)).

In the related-art improved type input source search support method, however, nothing is displayed on the screen when all the input sources including the initially selected input source are unavailable and thus all the input sources are skipped. In this case, the user does not understand why nothing is displayed and is thus bewildered. This deteriorates the usability of the projector.

Additionally, in the related-art improved type input source search support method, input sources in the so-called stand-by condition (input source from which image signals have not been generated yet even though they are connected with the projector and powered, hereinafter referred to as stand-by input sources) are skipped similarly to the input sources unavailable. Thus, the user cannot select the stand-by input sources even if they are desired input sources.

These problems occur not only in the projector at the time of searching for input sources, but also in another image display apparatus to which a plurality of input sources can be connected at the time of searching for input sources.

SUMMARY

Accordingly, a first advantage of some aspects of the invention is to provide an input source search support method capable of efficiently searching for an input source currently outputting image signals and providing information that no image signal is outputted from any of input sources to the user even when no image signal is outputted therefrom.

A second advantage of some aspects of the invention is to provide an input source search support method capable of selecting stand-by input sources.

A third advantage of some aspects of the invention is to provide an image display apparatus and a projector using the search support method.

An image display apparatus for displaying an image produced by image signals on a display section according to a first aspect of the invention includes: a plurality of input terminals for receiving each of the image signals supplied from a plurality of input sources; an input selector for selecting a predetermined input terminal from the plural input terminals; a judging section for determining whether the image signals have been inputted to the input terminal selected by the input selector; an operating section which receives requirement of search processing for determining whether the image signals have been inputted to each of the plural input terminals; an image signal correcting section which generates image signals for producing a source search screen indicating search status for each of the input source names corresponding to the input terminals; and a control section for displaying an image of the source search screen produced by the image signals at least on the display section in response to search processing required through the operation section. The control section commands the input selector to sequentially select the input terminals when the search processing is required through the operation section, and commands the judging section to check the presence or absence of the image signals for each of the selected input terminals. The control section commands the image signal correcting section to add to the source search screen an indication that the image signals have not been inputted to any of the checked input terminals when the image signals have not been inputted thereto. The control section commands the image signal correcting section to close the source search screen when it is determined that the image signals have been inputted to any of the input terminals, and commands the display section to display an image produced by the image signals from the input terminal from which the image signals have been detected.

In this structure, the control section commands the input selector to sequentially select the input terminals when the search processing is required through the operation section, and commands the judging section to check the presence or absence of the image signals for each of the selected input terminals. The control section commands the image signal correcting section to add to the source search screen an indication that no image signal is inputted to any of the checked input terminals when no image signal is inputted thereto. Thus, the indication that no image signal is inputted from the input source corresponding to the searched input terminal is added to the source search screen on the display section of the image display apparatus one after another.

Accordingly, the supply status of the image signals can be visually checked in real time by the user for each input source. Moreover, when no image signal is inputted from any of the input sources, this condition can be visually displayed on the source search screen.

Additionally, in this structure, the control section commands the image signal correcting section to close the source search screen when it is determined that the image signals have been inputted to any of the input terminals, and commands the display section to display an image produced by the image signals from the input terminal from which the image signals have been detected. Thus, the image display apparatus closes the source search screen when it is determined that the image signals have been inputted, and projects images produced by the image signals from the input source corresponding to this input terminal on the display section.

Accordingly, the image display apparatus can offer visual information that the input source search has been completed to the user and can efficiently search for the image source which is outputting the image signals.

Therefore, the image display apparatus according to the first aspect of the invention is capable of efficiently searching for the input source which is outputting image signals and providing information that no image signal is inputted from any of the input sources to the user even when no image signal is inputted therefrom.

In the image display apparatus according to the first aspect of the invention, it is preferable that the control section commands the image signal correcting section to close the source search screen and commands the input selector to select the input terminal corresponding to the selected input source when no image signal is inputted to any of the input terminals and processing for selecting any of the input sources is executed on the source search screen through the operation section.

In this structure, the control section commands the image signal correcting section to close the source search screen and commands the input selector to select the input terminal corresponding to the selected input source when processing for selecting any of the input sources is executed on the source search screen. Thus, the image display apparatus can select the input terminal corresponding to the input source selected on the source search screen even when no image signal is inputted to any of the input terminals.

Accordingly, the image display apparatus according to the first aspect of the invention can select input sources in the standby condition.

In the image display apparatus according to the first aspect of the invention, it is preferable that the image display apparatus further includes a storage section for storing an initial input terminal selected by the input selector before the search processing is required, and that the control section commands the image signal correcting section to close the source search screen and commands the input selector to select the initial input terminal stored in the storage section when it is determined that no image signal has been inputted to any of the input terminals and processing for selecting any of the input sources is not executed through the operation section within a predetermined time.

In this structure, the control section commands the image signal correcting section to close the source search screen and commands the input selector to select the initial input terminal stored in the storage section when it is determined that no image signal has been inputted to any of the input terminals and processing for selecting any of the input sources is not executed through the operation section within the predetermined time. Thus, the image display apparatus automatically returns to the initial setting after elapse of the predetermined time when the search processing is completed and no image signal is detected.

Accordingly, the image display apparatus can provide definite and visual information that the search processing has been completed to the user by closing the source search screen and returning to the condition of initial setting. Additionally, if the search processing is again required in this condition, the image display apparatus similarly returns to the initial setting. This notifies the user that any operation such as operation requiring any of the input sources to output image signals needs to be executed so as to display images.

In the image display apparatus according to the first aspect of the invention, it is preferable that, in the case where image signals have been inputted to the initial terminal selected by the input selector before the search processing is required, the control section commands the image signal correcting section to generate image signals for producing the source search screen including the input source name corresponding to the initial input terminal and the indication that image signals have been inputted to the initial input terminal in response to the search processing required through the control section before the respective sections perform operation corresponding to the search processing.

In this structure, the control section commands the image signal correcting section to generate image signals for producing the source search screen including the input source name corresponding to the initial input terminal and the indication that the image signals have been inputted to the initial input terminal in response to the search processing executed through the control section before the respective sections perform operation corresponding to the search processing in the case that image signals have been inputted to the initial input terminal. Thus, the image display apparatus displays the indication that image signals have been inputted to the initial input terminal and searches for other input sources supplying image signals even when image signals have been inputted to the initial input terminal.

Accordingly, the image display apparatus according to the first aspect of the invention can display the information that image signals have been inputted to the initial input terminal on the search screen and search for other input sources supplying image signals even when image signals have been inputted to the initial input terminal.

In the image display apparatus according to first aspect of the invention, it is preferable that the control section commands the input selector to select the initial input terminal and commands the image signal correcting section to superpose the source search screen, which is smaller than the image produced by the image signals inputted from the initial input terminal, on the image signals inputted from the initial input terminal for a predetermined time when no image signal is inputted to input terminals other than the initial input terminal.

In this structure, the control section commands the input selector to select the initial input terminal and commands the image signal correcting section to superpose the source search screen, which is smaller than the image produced by the image signals inputted from the initial input terminal, on the image signals inputted from the initial input terminal for the predetermined time when no image signal is inputted to input terminals other than the initial input terminal. Thus, the image display apparatus displays the source search screen for the predetermined time on the background of the image produced by the image signals inputted from the initial input terminal after the completion of the search processing.

Accordingly, the image display apparatus can display the source search screen while providing visual information showing that image signals have been inputted from the input source corresponding to the initial input terminal to the user using the background image produced by the image signals from the initial input terminal. Since the superposition of the source search screen finishes after elapse of the predetermined time, only the image produced by the image signals inputted from the initial input terminal is displayed.

An image display apparatus for displaying an image produced by image signals on a display section according to a second aspect of the invention includes: a plurality of input terminals for receiving each of the image signals supplied from a plurality of input sources; an input selector for selecting a predetermined input terminal from the plural input terminals; a judging section for determining whether the image signals have been inputted to the input terminal selected by the input selector; an operating section which receives requirement of search processing for determining whether the image signals have been inputted to each of the plural input terminals; an image signal correcting section which generates image signals for producing a source search screen indicating search status for each of the input source names corresponding to the input terminals; and a control section for displaying an image of the source search screen produced by the image signals at least on the display section in response to search processing required through the operation section. The control section commands the input selector to sequentially select the input terminals when the search processing is required through the operation section, and commands the judging section to check the presence or absence of the image signals inputted for each of the selected input terminals. The control section commands the image signal correcting section to sequentially add an indication of the presence or absence of the image signals for each of the input terminals having been checked by the judging section on the source search screen so as to check the presence or absence of the image signals for all the input terminals.

In this structure, the control section commands the input selector to sequentially select the input terminals when the search processing is required through the operation section, and commands the judging section to check the presence or absence of the image signals inputted for each of the selected input terminals. The control section commands the image signal correcting section to sequentially add the indication of the presence or absence of the image signals for each of the input terminals having been checked by the judging section on the source search screen so as to check the presence or absence of the image signals for all the input terminals. Thus, the image display apparatus checks the presence or absence of the image signals for all the input terminals while adding the information on the presence or absence of the image signals for each of the input terminals, and displays a list showing the results.

Accordingly, the image display apparatus can provide visual information on the checking status of the image signals to the user for each input source one after another, and efficiently notify the search results using the source search screen including the list which shows the presence or absence of the image signals for all the input terminals. Since the list on the source search screen showing the presence or absence of the image signals for all the input sources allows the user to select the desired input source when the image signals from the plural input sources are detected, the usability of the image display apparatus is enhanced.

Accordingly, the image display apparatus can efficiently search for the input source which is outputting the image signals. When no image signal is inputted from any of the input sources, the image display apparatus provides to the user visual information on this fact.

In the image display apparatus according to the second aspect of the invention, it is preferable that the control section commands the image signal correcting section to close the source search screen and commands the input selector to select the input terminal from which image signals have been detected first when the processing for selecting any of the input sources is not executed through the operation section within a predetermined time after checking the presence or absence of image signals for all the input terminals.

In this structure, the control section commands the image signal correcting section to close the source search screen and commands the input selector to select the input terminal from which image signals have been detected first when the processing for selecting any of the input sources is not executed through the operation section within the predetermined time after checking the presence or absence of image signals for all the input terminals. Thus, the image display apparatus closes the source search screen and displays the image produced by the image signals from the input source corresponding to the input terminal from which the image signals have been detected first.

Accordingly, the image display apparatus can efficiently search for the input source which is outputting the image signals, and automatically display the image produced by the image signals from this input source.

In the image display apparatus according to first or second aspect of the invention, it is preferable that the control section commands the image signal correcting section to superpose an indication that the image signals are being detected on the source search screen while the judging section is checking the presence or absence of image signals for each of the selected input terminals.

In this structure, the control section commands the image signal correcting section to superpose the indication that image signals are being detected on the source search screen while the judging section is checking the presence or absence of image signals for each of the selected input terminals. Thus, the image display apparatus superposes on the source search screen the indication that image signals are being detected while the judging section is checking the presence or absence of image signals for each of the selected input terminals.

Accordingly, the image display apparatus can provide visual information that image signals are being detected to the user. This eliminates such anxiety that the operation might have frozen from the user.

In the image display apparatus according to the first or second aspect of the invention, it is preferable that, in the case where the source search screen is closed and that image signals have not been inputted to the input terminal selected by the input selector in response to the operations by the respective sections based on the search processing or to the selecting processing through the operation section, the control section commands the image signal correcting section to generate image signals for producing a screen showing the selected input source name and an indication that image signals have not been inputted on the display section.

In this structure, the control section commands the image signal correcting section to generate and display image signals for producing the screen showing the selected input source name and the indication that image signals have not been inputted on the display section in the case that image signals have not been inputted to the input terminal selected by the input selector after completion of the search processing. Thus, the image display apparatus displays the screen including the indication that no image signal has been inputted to the selected input source after the search processing is completed and the search screen is closed.

Accordingly, the image display apparatus can provide to the user visual information that image signals have not been inputted to the selected input terminal after the search processing is completed and the input terminal is selected. This notifies the user that any operation such as operation requiring output of image signals to input sources needs to be executed so as to display images.

It is preferable that the image display apparatus according to the first or second aspect of the invention is a projector which modulates light emitted from a light source section into modulated light in accordance with the image signals using light modulating elements, and enlarges and projects the modulated light using a projection lens.

A projector which can provide enlarged images using a projection lens have been widely used for various purposes such as presentation using a PC (personal computer) and movie watching using a DVD. In these applications, the number of input sources connected to the projector is generally small as in the case where only a PC and a DVD are used. Thus, there is a demand from the user of the projector for quick selection of the input source supplying image signals or for checking if image signals have been outputted from the input source.

Thus, the image display apparatus according to the first or second aspect of the invention can be appropriately used as a projector.

Accordingly, the projector according to the first or second aspect of the invention can efficiently search for the input source which is outputting image signals and notify the user that no image signal is inputted from any of the input sources when no image signal is inputted therefrom.

An input source search support method according to a third aspect of the invention includes: a first step for receiving input source search start requiring processing from the user and showing a source search screen including a list of input sources which can be displayed on an image display apparatus (also referred to as "input source list screen") while an image corresponding to an input source is being displayed; and a second step for executing processing for detecting the presence or absence of image signals for input sources which can be displayed on the image display apparatus other than the input source whose image is being displayed in the first step until image signals are detected sequentially in a predetermined order. An image corresponding to any of the input sources starts to be displayed when image signals therefrom are detected, and information showing that no image signal has been detected is displayed on the source search screen when no image signal is detected in the second step.

When all the input sources are unavailable and no image signal is detected in the image source search support method according to the third aspect of the invention, the information that no image signal has been detected is visually shown on the source search screen. Thus, when all the input sources are unavailable, this information can be visually shown to the user and the first advantage according to some aspects of the invention can be offered.

In the input source search support method according to the third aspect of the invention, the condition where an image corresponding to an input source is being displayed in the first step includes the case where a message screen saying "no image signal inputted" and the like is displayed since image signals are not inputted from this input source, as well as the case where an image produced by image signals from this input source is being displayed.

In the input source search support method according to the third aspect of the invention, it is preferable that the information on the presence or absence of image signals is stored, and that this information is displayed for each of the input sources when the source search screen is displayed.

In this method, the information on the presence or absence of image signals can be displayed on the source search screen for each input source during and after the source search. It is therefore possible to check from which input source the image signals are coming, and thus the usability is enhanced.

In the input source search support method according to the third aspect of the invention, it is preferable that, in the case where no image signal is detected in the second step and the user selects a particular input source through the source search screen, an image corresponding to the particular input source starts to be displayed.

In this method, the input source in the standby condition can be selected by selecting the particular input source through the source search screen. Thus, the second advantage according to some aspects of the invention can be offered.

In the input source search support method according to the third aspect of the invention, it is preferable that the image corresponding to the input source which is being displayed in the first step starts to be displayed when no image signal is detected in the second step and the user executes canceling operation or no operation within the predetermined time.

Search for input sources is generally conducted when the power switch of the image display apparatus is turned on or while the image of the input source which is being displayed in the first step is under display in the image display apparatus. Thus, when the user executes canceling operation or no operation within the predetermined time in the latter case, the screen can be returned to the initial screen. Accordingly, the usability of the image display apparatus can be enhanced.

In the input source search support method according to the third aspect of the invention, it is preferable that the image corresponding to the input source which is being displayed in the first step is displayed as the background of the source search screen when no image signal is detected in the second step.

As mentioned above, search for input sources is generally conducted when the power switch of the image display apparatus is turned on or while the image of the input source which is being displayed in the first step is under display in the image display apparatus. Thus, when no image signal is detected in the second step in the latter case, the initial screen is displayed as the background of the source search screen. Accordingly, the usability of the image display apparatus can be enhanced.

In the input source search support method according to the third aspect of the invention, it is preferable that information on the input source which is being searched and information showing that image signals are being detected are displayed on the source search screen while the image signals are being detected in the second step.

Since information on the input source which is being searched and information showing that image signals are being detected are displayed on the source search screen while the image signals are being detected in this method, the information on the search condition can be securely provided to the user. Thus, the usability of the image display apparatus can be enhanced.

An input source search support program according to a fourth aspect of the invention executed by an image display apparatus for displaying images produced by image signals, under which program the image display apparatus executes: a first step for receiving input source search start requiring processing from the user and showing a source search screen including a list of input sources which can be displayed on an image display apparatus while an image corresponding to an input source is being displayed; and a second step for executing processing for detecting the presence or absence of image signals for input sources which can be displayed on the image display apparatus other than the input source whose image is being displayed in the first step until image signals are detected sequentially in a predetermined order. An image corresponding to any of the input sources starts to be displayed when image signals therefrom are detected, and information showing that no image signal has been detected is displayed on the source search screen when no image signal is detected in the second step.

When all the input sources are unavailable in the input source search support method according to the third aspect of the invention used in the image display apparatus, no image signal is detected and thus the information that no image signal is detected is shown on the source search screen. Accordingly, when all the input sources are unavailable, this information is shown to the user.

An image display apparatus according to a fifth aspect of the invention has: a first function for receiving search processing from the user and showing a source search screen including a list of input sources which can be displayed on an image display apparatus while an image corresponding to an input source is being displayed; and a second function for executing processing for detecting the presence or absence of image signals for input sources which can be displayed on the image display apparatus other than the input source whose image is being displayed in the first function until image signals are detected sequentially in a predetermined order. An image corresponding to any of the input sources starts to be displayed when image signals therefrom are detected, and information showing that no image signal has been detected is displayed on the source search screen when no image signal is detected in the second function.

When all the input sources are unavailable in the image display apparatus according to the fifth aspect of the invention, no image signal is detected and thus the information that no image signal is detected is shown on the source search screen. Accordingly, when all the input sources are unavailable, this information is shown to the user.

BRIEF DESCRIPTION OF THE DRAWINGS

The invention will be described with reference to the accompanying drawings, wherein like numbers refer to like elements.

DESCRIPTION OF EXEMPLARY EMBODIMENTS

Several embodiments according to the invention are hereinafter described in detail with reference to the accompanying drawings.

First Embodiment

Structure of Projector

Figure 1:
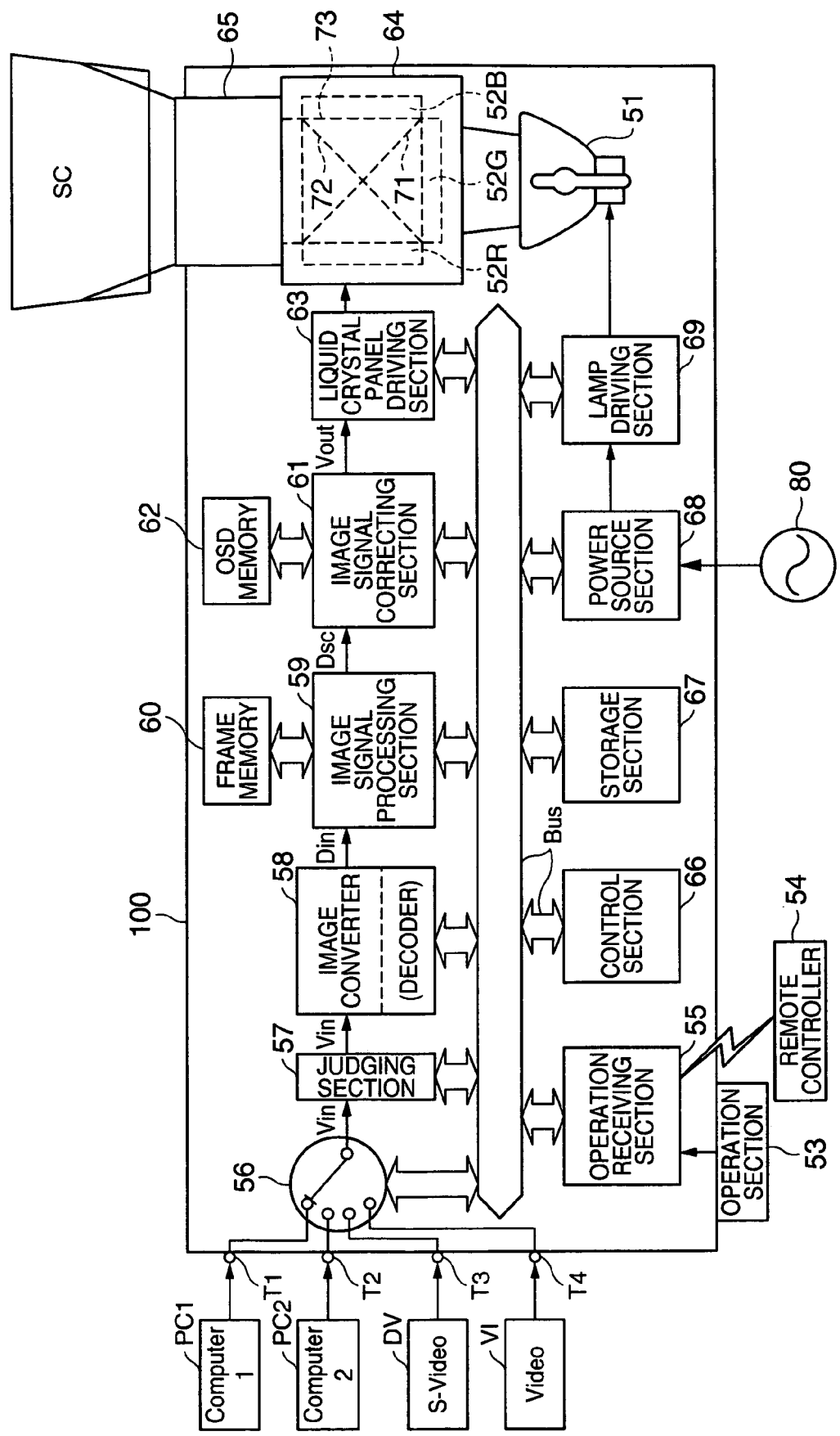
FIG. 1 schematically shows a projector in a first embodiment.

FIG. 1 is a block diagram schematically showing a structure of a projector as an image display apparatus according to the invention. The general structure of a projector 100 is now discussed with reference to FIG. 1.

The projector 100 divides white light emitted from a lamp 51 as a light source into three primary colors of red light, blue light and green light. The respective color lights are modulated by liquid crystal light valves 52R, 52G and 52B as display sections based on image signals supplied from input sources. The modulated lights are synthesized into full-color light, which is then enlarged and projected on a screen SC using a projection lens 65. Thus, the projector 100 is a so-called liquid crystal three-plate type projector.

The liquid crystal valves 52R, 52G and 52B are light modulating elements, each of which is used for red light, green light and blue light, respectively, and is contained in an optical section 64.

The projector 100 includes the lamp 51, an operation section 53, a remote controller 54, an operation receiving section 55, input terminals T1 through T4, an input selector 56, a judging section 57, an image converter 58, an image signal processing section 59, a frame memory 60, an image signal correcting section 61, an OSD memory 62, a liquid crystal panel driving section 63, the optical section 64, the projection lens 65, a control section 66, a storage section 67, a power source section 68, a lamp driving section 69 and others.

The lamp 51 is formed by a discharge-type lamp capable of providing high luminance such as a high-pressure mercury lamp, a metal halide lamp and a halogen lamp.

The operation section 53 is provided on the upper surface of the main body of the projector 100, and has a plurality of operation buttons used for manipulation of the projector 100. The plural operation buttons include a "power source button" for startup and shutdown of the projector 100, an "source search button" for searching for an input source currently providing image signals, a "source selection button" provided for each input source for selecting a desired input source, and other buttons (all these buttons are not shown).

The remote controller 54 as the operation section is a remote controller for controlling the projector 100 from a remote site, and has a plurality of operation buttons similar to those of the operation section 53 for operating the projector 100.

When the operation section 53 or the remote controller 54 is operated, the operation receiving section 55 receives this processing and transmits operation signals to the control section 66 as triggers for various operations.

The input terminals T1 through T4 are input terminals through which each of the image signals supplied from a plurality of external electronic devices PC1, PC2, DV and VI as input sources is inputted to the projector 100.

The input terminals T1 and T2 are formed by mini D-sub 15 pin terminals, for example, through which analog RGB signals supplied from personal computers PC1 and PC2 are inputted. It is also possible to input component signals by changing use allocations of signal conductors of 15 pins provided on the mini D-sub 15 pin terminals.

The input terminal T3 is formed by an S terminal, for example, through which S signals are supplied from a DVD player DV, S video player and the like.

The input terminal T4 is formed by a 1RCA terminal, for example, through which composite signals are supplied from a video player VI, TV tuner and the like.

Other input terminals such as a stereo mini jack or other audio input terminals through which audio signals are inputted, an USB terminal for allowing various information exchanges between an external PC and the projector 100, and an RS232C terminal are equipped as input terminals of the projector 100, but these input terminals are not shown for simplification of the description.

The external electronic devices PC1, PC2, DV and VI are now discussed showing how they are expressed in the input source names.

More specifically, the personal computers PC1 and PC2 are expressed as "computer 1" and "computer 2" in the input source names. Similarly, the DVD player DV and the vide player VI are expressed as "S-Video" and "Video".

The input selector 56 is a selection switch for selecting a desired input terminal from the input terminals T1 through T4. The input selector 56 selects any one of the four input terminals based on the selection signals from the control section 66. Thus, when the input source associated with the selected input terminal supplies image signals Vin, the projector 100 projects an image produced by the image signals Vin.

The default input source of the projector 100 at the time of shipment is set to "Computer 1". By operating the "source search button" of the remote controller 54 after startup of the projector 100, for example, the input selector 56 sequentially selects the input terminals T1 through T4, thereby switching the input source from "Computer 1" to "Computer 2", "S-Video", and "Video" in this order.

At the time of shutdown of the projector 100, the input source information selected at that time is stored in the storage section 67, and the same input source reappears at the next startup.

The judging section 57 is formed by a comparator, for example, and determines whether the image signals Vin are supplied from the input source selected by the input selector 56 or not by checking the presence or absence of synchronous signals contained in the image signals Vin. The judging section 57 then transmits judging signals showing the presence or absence of the inputted image signals Vin to the control section 66.

The image converter 58 converts the analog image signals Vin into digital image signals Din, and outputs the digital image signals Din. The conversion into digital signals is performed so that various image signal processing can be applied to the image signals Vin. The image converter 58 contains a decoder.

More specifically, the image converter 58 applies the image signal processing including the A/D conversion processing to the image signals Vin when they are analog RGB signals from the input sources "Computer 1" and "Computer 2". However, the image converter 58 applies the image signal processing including the A/D conversion processing to the image signals Vin after they are converted into component signals by the decoder accommodated in the image converter 58 when the image signals Vin are S signals from the input source "S-Video" or composite signals from the input source "Video".

The image signal processing section 59 performs image signal processing such as writing the image data of the image signals Din to the frame memory 60 and reading the image data therefrom under predetermined conditions so that the image signals Din can be appropriately displayed using the liquid crystal light valves 52R, 52G and 52B. This image signal processing includes scaling processing for enlarging and reducing the images produced by the image signals Din so that the resolution of the images coincides with the resolution of the liquid crystal light valves 52R, 52G and 52B, frame rate alteration processing for altering frame rates indicating the number of times of image-drawing updates per second, and other processing. The image signals Din to which this image signal processing have been applied are outputted as digital image signals Dsc.

The image signal correcting section 61 applies γ correcting processing for changing the gradation value of the image signals Dsc to a gradation value appropriate for the display using the liquid crystal light valves 52R, 52G and 52B, color non-uniformity correction processing for correcting color non-uniformity caused due to luminance non-uniformity peculiar to each of the liquid crystal light valves 52R, 52G and 52B. The image signal correcting section 61 then converts the image signals Dsc into analog image signals Vout and outputs the analog image signals Vout.

Additionally, the image signal correcting section 61 has OSD (On-Screen Display) function for superposing the input source name on the image produced by the image signals Vin.

The image signal correcting section 61 reads out the "input source name" and the "source search" screen of the input source, for example, from the OSD memory 62 based on the OSD signals coming from the control section 66, and superposes theses information on the image signals Dsc.

When the image signals Vin are not inputted, the image signal correcting section 61 reads out the "standby" screen showing the "input source name" and the message in characters saying "no image signal inputted" on the blue background screen, for example, from the OSD memory 62. The image signal correcting section 61 generates and outputs the image signals Vout for producing the "standby" screen.

The OSD memory 62 is formed by nonvolatile memory, and stores screens, various character patterns and the like showing the operating conditions of the projector for the On-Screen Display such as "input source names", various examples of "source search" screens of the input sources, and the "standby" screen.

The liquid crystal panel driving section 63 is a liquid crystal driver, which supplies the image signals Vout, driving voltage and the like to the liquid crystal light valves 52R, 52G and 52B and projects images on the liquid crystal light valves 52R, 52G and 52B.

The optical section 64 includes: an integrator optical system (not shown) for converting white light emitted from the lamp 51 into substantially collimated light having stable luminance distribution; a separation optical system (not shown) for separating the white light having stable luminance distribution into three primary light colors constituted by red, green and blue light components and for supplying these lights to the respective liquid crystal light valves 52R, 52G and 52B; and a synthesis optical system for synthesizing the respective color lights each of which has been modulated by the liquid crystal light valves 52R, 52G and 52B based on the image signals Vout.

The respective modulated color lights released from the liquid crystal light valves 52R, 52G and 52B are synthesized by a cross dichroic prism 73 as the synthesis optical system having a dichroic film 71 for reflecting blue light and transmitting green light and a dichroic film 72 for reflecting red light and transmitting green light. The synthesized full-color light which has been modulated based on the image signals Vout is then released as the substantially collimated and modulated light.

The projection lens 65 is constituted by a convex lens and the like. The projection lens 65 enlarges the modulated light coming from the cross dichroic prism 73 so that the light can be projection light, and projects images on the screen SC. The projection lens 65 has a zoom function for controlling the rates of enlargement of the projection light, and a focus function for controlling the focus of the projection light.

The control section 66 is formed by a CPU (Central Processing Unit). The control section 66 transmits and receives signals to and from the respective sections through bus lines Bus, and controls the operations of the respective sections in accordance with operation signals coming from the control receiving section 55 and the like.

The storage section 67 is formed by a nonvolatile memory such as flash memory in which data is rewritable, for example. The storage section 67 stores various control programs, firmware, and accompanying data used for commanding and controlling the operation of the projector 100.

The control programs include a "source search program" as a search support program used for searching the input source which is supplying the image signals. The accompanying data includes the input terminal name having been selected by the input selector before performing the "source search program, and other data.

The power source section 68 introduces alternating current power from an external power source 80 through a plug (not shown), and applies processing such as transformation, rectification and smoothing to the alternating current by an AC/DC converting section (not shown) contained in the power source section 68 so as to supply stabilized direct current to the respective sections of the projector 100.

The lamp driving section 69 includes an igniter circuit (not shown) for receiving power supply from the power source section 68 and forming a discharge path by generating high voltage so as to turn on the lamp 51 as a discharge type lamp, and a ballast circuit (not shown) for maintaining the stable turned-on condition of the lamp 51 after it is turned on.

First Example of Input Source Search

Figure 2:
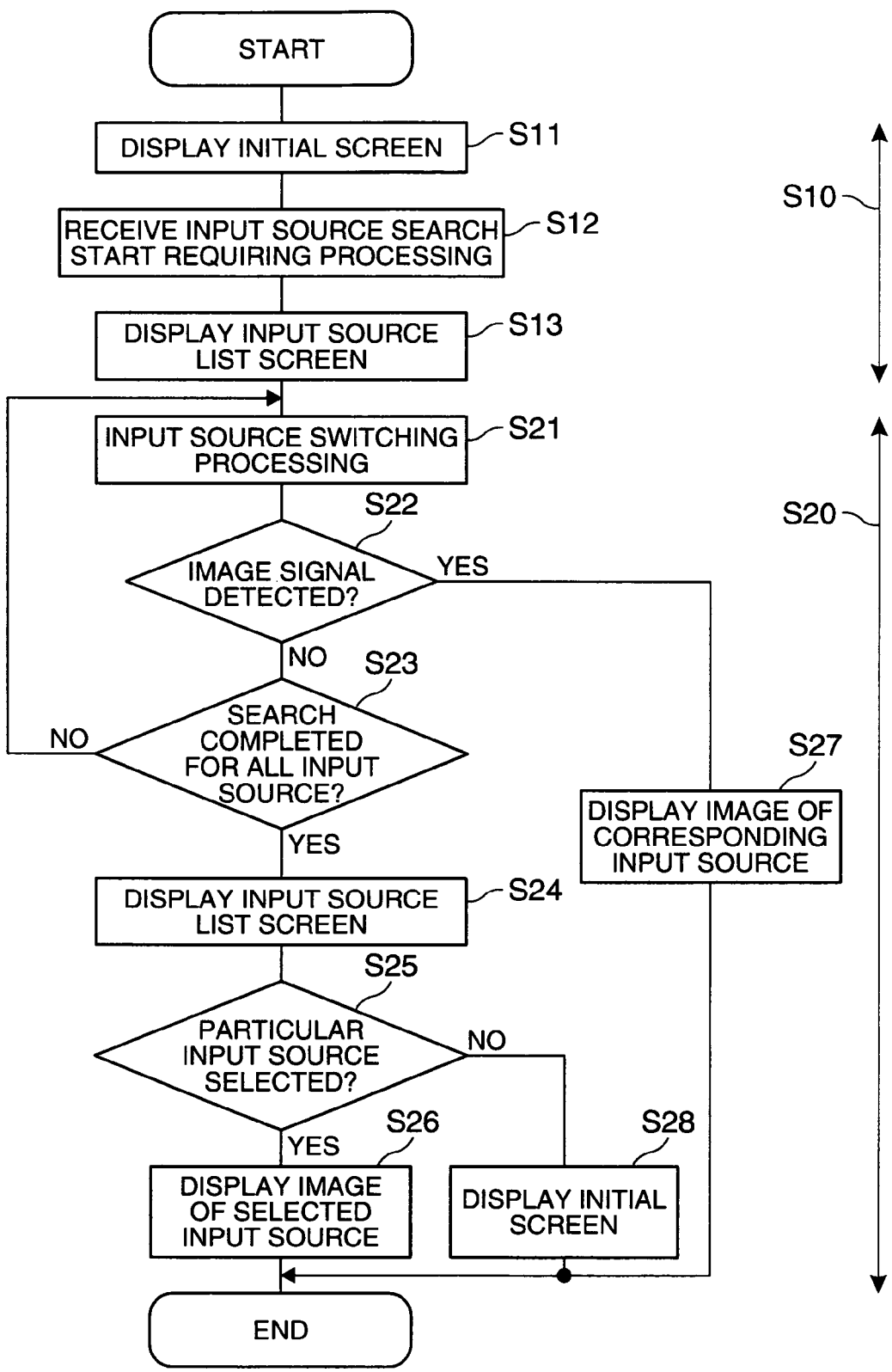
FIG. 2 is a flowchart showing an input source search support method in the first embodiment.

FIG. 2 is a flowchart showing an input source search support method in the first embodiment. FIGS. 3 through 10 illustrate examples of display screens in the first embodiment.

In this embodiment, an example of the input source search executed by the projector 100 is described with reference to FIG. 2 chiefly, and also FIGS. 1 and 3 through 10 as supplementary figures.

The input source search support method in the first embodiment is an input source search support method performed on the assumption that search for the input source is executed after startup of the projector 100.

In the input source search support method according to the first embodiment, it is assumed that the image of the input source "Computer 1" associated with the input terminal T1 is displayed when the power source switch of the projector 100 is turned on. It is also assumed that image signals are not outputted from the input source "Computer 1" at that time.

As shown in FIG. 2, the input source search support method in the first embodiment has a first step S10 and a second step S20.

When the "power source button" of the remote controller 54 is operated, operation signals are transmitted from the operation receiving section 55 to the control section 66. The control section 66 having received the operation signals brings the respective sections into startup conditions, and initializes these sections. The control section 66 commands the input selector 56 to selects the input terminal T1 as the default input terminal.

Figure 3:
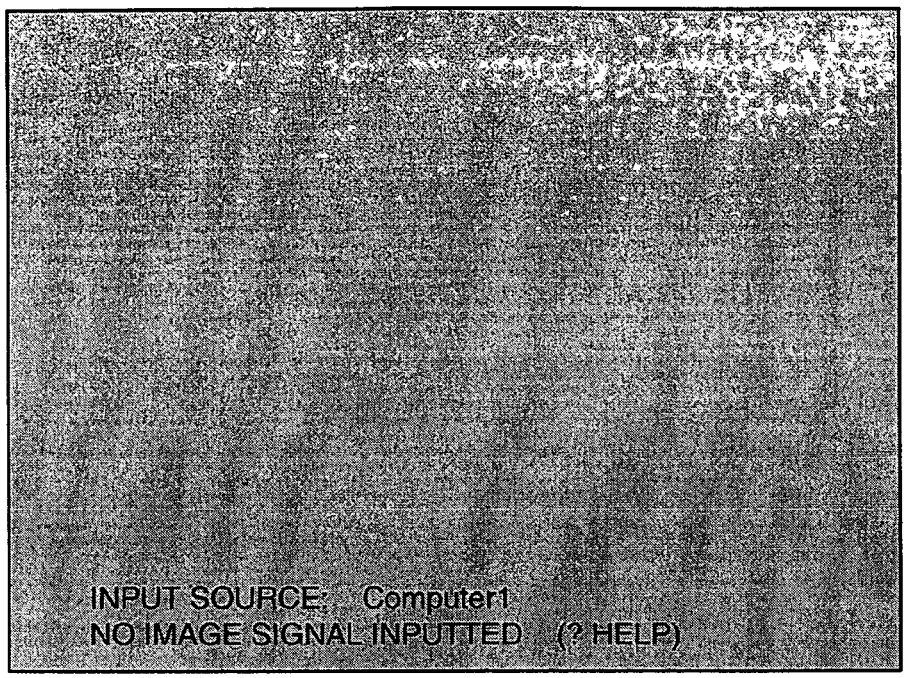
FIG. 3 shows an example of a display screen.

In step S11, the control section 66 commands the image signal correcting section 61 to generate image signals for producing the "standby" screen shown in FIG. 3 and project the corresponding image based on the judging signals coming from the judging section 57 showing that no image signal is inputted from the input source "Computer 1" associated with the input terminal T1. The message "no image signal inputted" is displayed on the "standby" screen.

In step S12, the control section 66 receives the operation signals from the operation receiving section 55 which are transmitted when the "source search button" of the remote controller 54 is operated, and executes the "source search program" stored in the storage section 67. The operations carried out by the respective sections in the following respective steps are performed under the "source search program". The control section 66 commands the storage section 67 to store the input terminal selected by the input selector 56 at the start of the source search processing as the initial input terminal.

Figure 4:
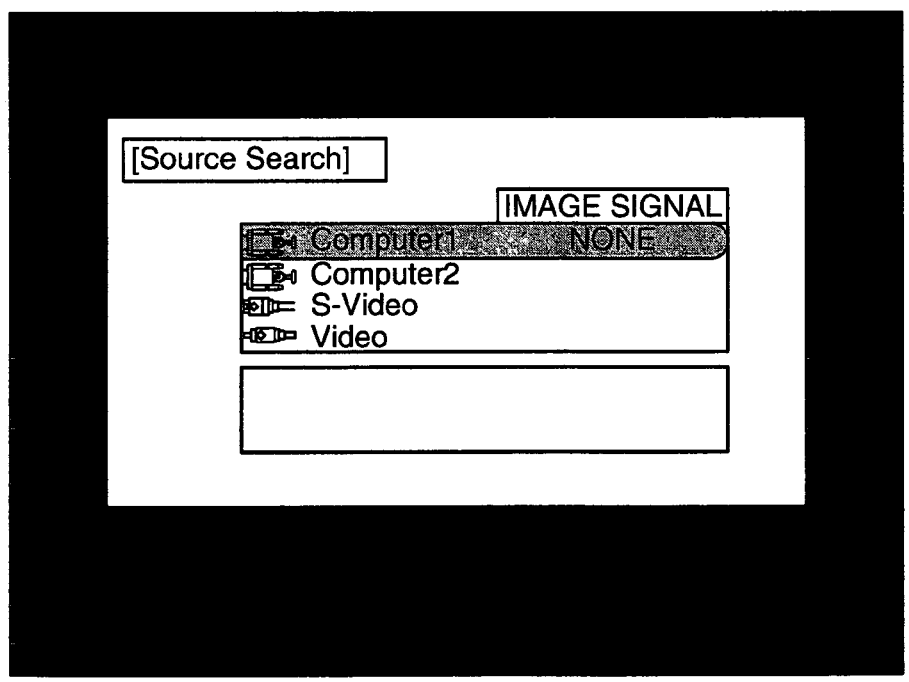
FIG. 4 shows an example of a display screen.

In step S13, the control section 66 commands the image signal correcting section 61 to generate the image signals for producing the "source search" screen shown in FIG. 4, and project the corresponding image. The "source search" screen in FIG. 4 includes a message "none", which shows no image signal is inputted, for the input source "Computer 1".

The steps S11 through S13 discussed above correspond to the first step S10.

In step S21, the control section 66 commands the input selector 56 to select the next input terminal of the input terminal currently selected by the input selector 56 in the selection order. The selection order circulates as: "input terminal T1", "input terminal T2", "input terminal T3", "input terminal T4" and back to "input terminal T1".

In step S22, the control section 66 commands the judging section 57 to check the presence or absence of the image signals transmitted from the input source corresponding to the input terminal selected in step S21. When it is determined that the image signals have been inputted, the flow advances to step S27. When it is determined that the image signals have not been inputted, the flow goes to step S23.

In the respective steps, the control section 66 commands the image signal correcting section 61 to update the "source search" screen in accordance with the search conditions one after another.

Figure 5:
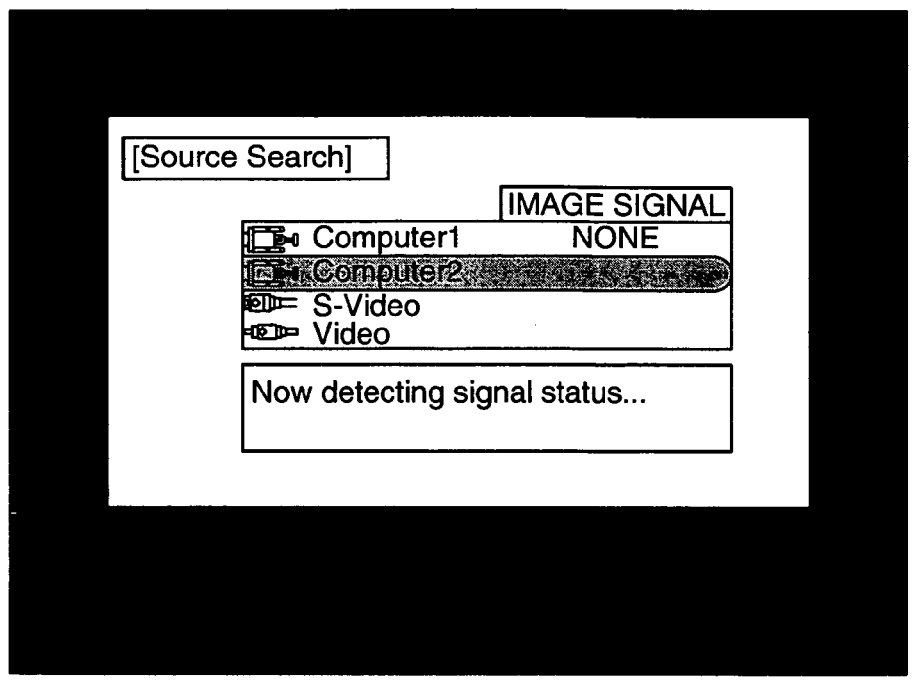
FIG. 5 shows an example of a display screen.
Figure 6:
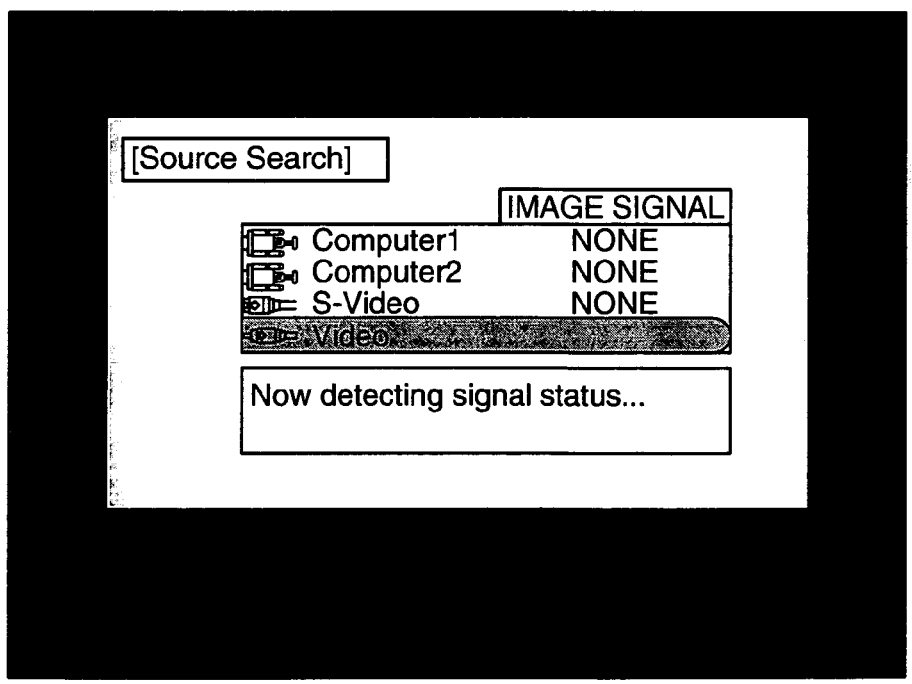
FIG. 6 shows an example of a display screen.

The "source search" screen shown in FIG. 5 is a screen indicating that image signals transmitted from the input source "Computer 2" corresponding to the input terminal T2 are being detected. This screen includes the message saying "now detecting signal status". The "source search" screen shown in FIG. 6 is a screen where the image signals transmitted from the input source "Video" corresponding to the input terminal T4 are being detected. This screen includes a message saying "now detecting signal status" similarly to the screen shown in FIG. 5.

In step S23, the control section 66 checks whether image signals have been detected for all the input terminals T1 through T4. When detection of the image signals is completed for all the input terminals, the flow advances to step S24. When detection is not completed for any of the input terminals, the flow returns to step S21.

Figure 7:
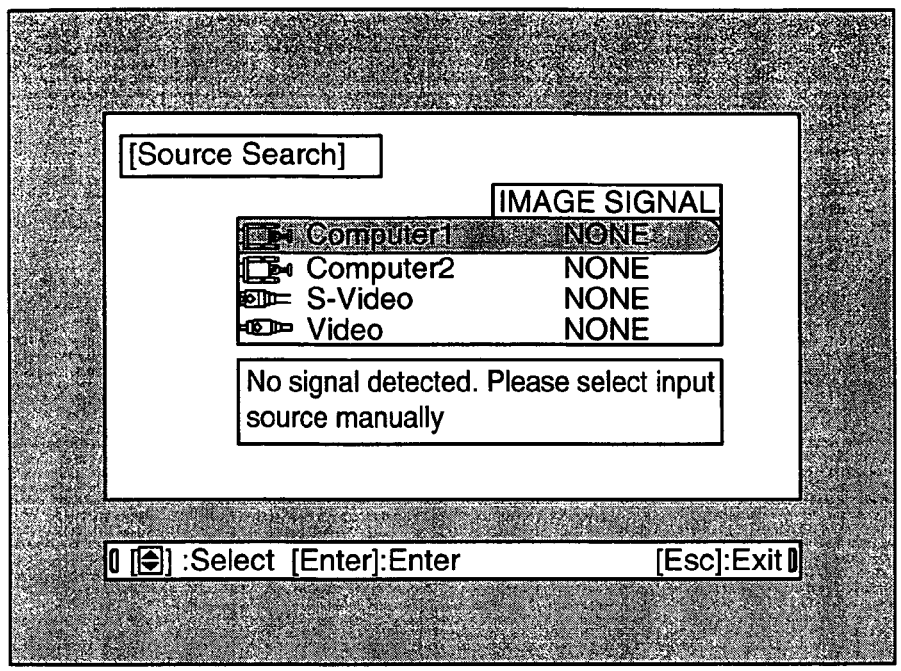
FIG. 7 shows an example of a display screen.

In step S24, the control section 66 commands the image signal correcting section 61 to generate image signals for producing the "source search" screen shown in FIG. 7, and project the corresponding image. The "source search" screen in FIG. 7 indicates that image signals have not been inputted from any of the input sources. The "source search" screen displays the message saying "No signal detected. Please select input source manually".

In step S25, the control section 66 checks whether the "source selection button" of the operation section 53 or the remote controller 54 has been operated within a predetermined time based on the presence or absence of the operation signals transmitted from the operation receiving section 55. When operation signals for selecting any of the input sources are detected, the flow proceeds to step S26. When the operation signals for selecting any of the input sources are not detected, the flow goes to step S28. The predetermined time herein is approximately 10 seconds.

In step S26, the control section 66 commands the image signal correcting section 61 to close the "source search" screen, and commands the input selector 56 to select the input terminal corresponding to the input source selected in step S25.

The processes to be performed when it is determined that the image signals have been inputted in step S22 are now discussed.

Figure 8:
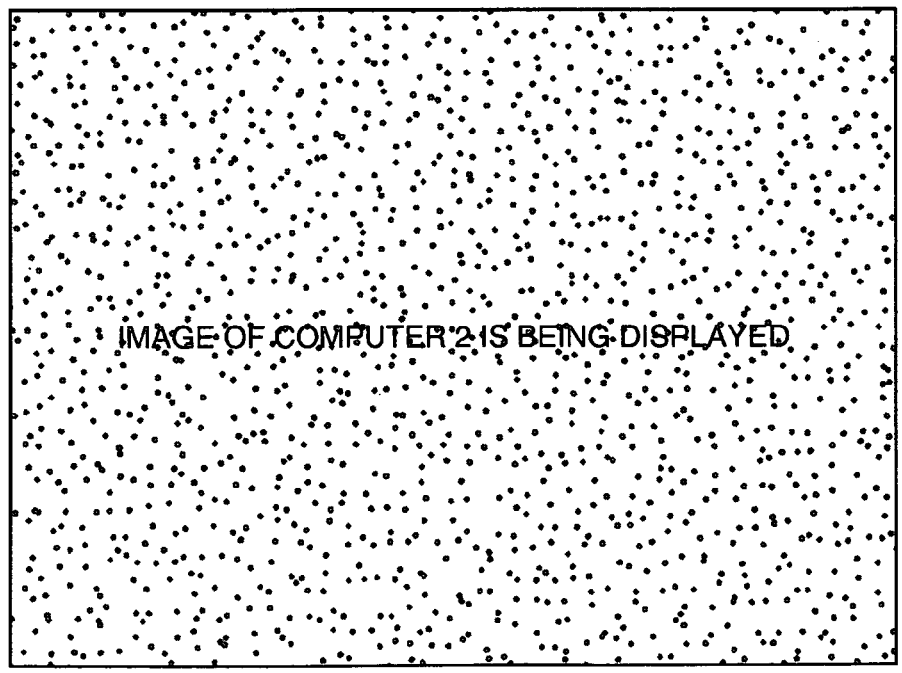
FIG. 8 shows an example of a display screen.

In step S27, the control section 66 commands the image signal correcting section 61 to close the "source search" screen, and project images produced by the image signals inputted to the input terminal from which the image signals have been detected in step S22. FIG. 8 shows a screen in the case that the image signals have been detected from the input terminal T2. The screen produced by the input source "Computer 2" is shown by dots for simplification.

Next, the processes to be performed when it is determined that the processing for selecting any of the input sources has not been conducted in step S25 are explained.

In step S28, since it is determined that the processing for selecting any of the input sources has not been conducted, the control section 66 commands the image signal correcting section 61 to close the "source search" screen. The control section 66 then reads out the information on the initial input terminal from the storage section 67, and commands the input selector 56 to select this input terminal.

Figure 9:
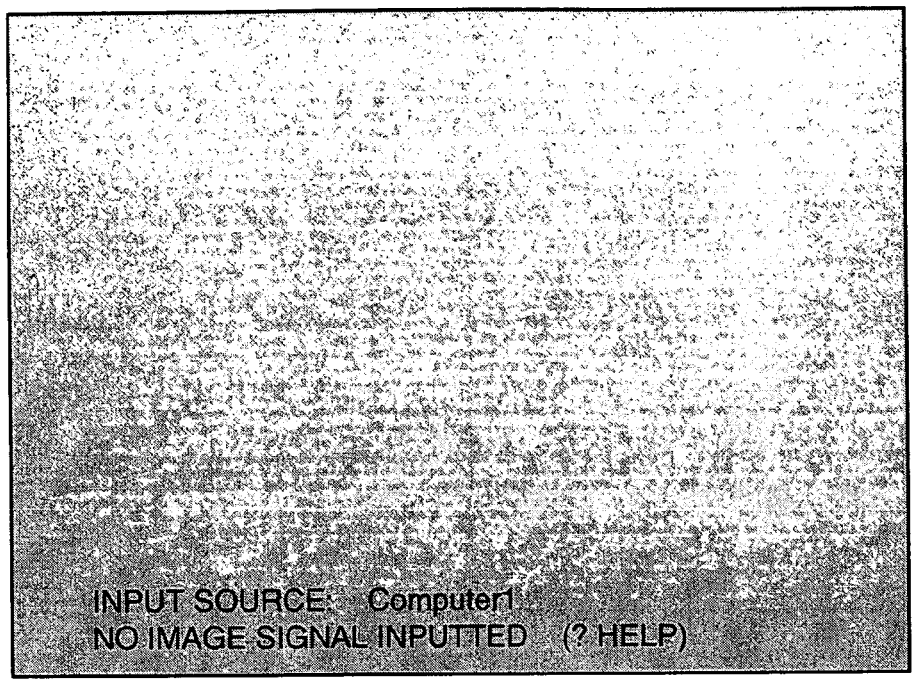
FIG. 9 shows an example of a display screen.
Figure 10:
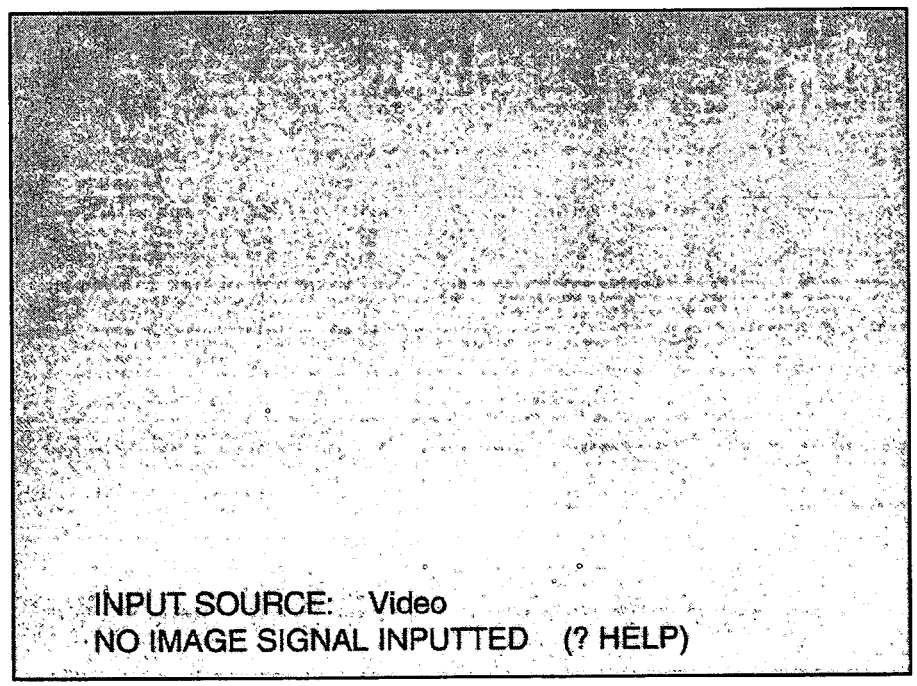
FIG. 10 shows an example of a display screen.

FIG. 9 shows a screen in this condition. This screen is similar to the "standby" screen shown in FIG. 3. When the initial input terminal is the input terminal T4, for example, a screen shown in FIG. 10 is displayed.

The steps S22 through S28 described above correspond to the second step S20.

According to this embodiment, the following advantages are offered.

(1) When search processing is required through the remote controller 54, the control section 66 commands the input selector 56 to select the input terminals T1 through T4 sequentially, and commands the judging section 57 to check the presence or absence of the inputted image signals for each of the selected input terminal. When it is determined that image signals have not been inputted to the input terminal checked by the judging section 57, a message showing this fact is added to the source search screen by the image signal correcting section 61. Thus, an indication showing the presence or absence of the image signals for each input terminal searched is sequentially added to the source search screen projected by the projector 100.

Accordingly, the supply status of image signals for each input source can be visually checked in real time by the user of the projector 100. Moreover, when no image signal is inputted from any of the input sources, this condition can be visually displayed on the source search screen.

Furthermore, the control section 66 commands the image signal correcting section 61 to close the source search screen when it is determined that image signals have been inputted to any of the input terminals, and project images produced by the image signals coming from the input terminals from which the image signals have been detected. Thus, the projector 100 closes the source search screen when it is determined that the image signals have been inputted, and projects images produced by the image signals from the input source corresponding to this input terminal.

Accordingly, the projector 100 can offer visual information that the input source search has been completed to the user and can efficiently search for the image source which is outputting image signals.

Therefore, the projector 100 can not only efficiently search for the input source which is outputting image signals, but also can notify the user that no image signal is inputted from any of the input sources even when no image signal is inputted therefrom. Moreover, the projector 100 can display the status of image signals for each image source by one action of easy search processing, and automatically connects the associated input sources when image signals from the input source are detected. Thus, usability of the projector 100 is enhanced.

(2) When processing for selecting any of the input sources is executed through the source search screen, the control section 66 commands the image signal correcting section 61 to close the source search screen and commands the input selector 56 to select the input terminal corresponding to the selected image source. Thus, the projector 100 selects the input terminal associated with the image source selected through the source search screen even when it is determined that no image signal is inputted to any of the input terminals.

Accordingly, the projector 100 can select input sources in the standby condition.

(3) When no image signal is inputted to any of the input terminals and processing for selecting any of the input sources is not executed within the predetermined time through the operation section, the control section 66 commands the image signal correcting section 61 to close the source search screen and commands the input selector 56 to select the initial input terminal stored in the storage section 67. Thus, the projector 100 automatically returns to the initial setting after elapse of the predetermined time if no image signal is detected after completion of the search processing.

Accordingly, the projector 100 can provide definite and visual information that the search processing has been completed to the user by closing the source search screen and returning to the condition of initial setting. Additionally, if the search processing is again executed in this condition, the projector 100 similarly returns to the initial setting. This notifies the user that any operation such as operation requiring any of the input sources to output image signals needs to be executed so as to display images.

(4) The control section 66 commands the image signal correcting section 61 to superpose the message saying that image signals are being detected on the source search screen while the judging section 57 is checking the presence or absence of image signals for each of the selected input terminals. Thus, the projector 100 projects the screen including the message that image signals are being detected while the judging section 57 is checking the presence or absence of image signals for each of the selected input terminals.

Accordingly, the projector 100 can provide visual information that image signals are being detected to the user. This eliminates such anxiety that the operation might have frozen from the user.

(5) When it is determined that image signals have not been inputted to the input terminal selected by the input selector 56 after completion of the search processing, the control section 66 commands the image signal correcting section 61 to generate image signals for producing the screen which displays the selected input source name and the message saying that image signals have not been inputted. Thus, the projector 100 displays the screen including the message that no image signal has been inputted to the selected input source after the search processing is completed and the search screen is closed.

Accordingly, the projector 100 can provide visual information that image signals have not been inputted to the selected input terminal after the search processing is completed and the input terminal is selected. This notifies the user that any operation such as operation requiring output of image signals to input sources needs to be executed so as to display images.

(6) In the first step S10, the projector 100 receives operation requiring start of input source search from the user and displays the source search screen including a list of input sources available for display by the projector 100 under the condition where an image provided by one of the input sources is being displayed. In the second step S20, detection of presence or absence of image signals continues in the predetermined order until image signals are detected from any of the input sources other than the input source which is providing the image.

When image signals are detected from any of the input sources in the second step S20, display of the corresponding input source starts. When no image signal is detected in this step, the information that no image signal has been detected is displayed on the source search screen. Thus, according to the image source search support method employed in the projector 100, no image signal is detected when all the input sources are unavailable, and the information that no image signal has been detected is displayed on the source search screen.

Accordingly, when all the input sources are unavailable in the image source search support method used in the projector 100, visual information showing that no input source is available is shown to the user. For practicing this search support method, the projector 100 executes the "source search program".

Therefore, when all the input sources are unavailable, the "source search program" can provide visual information that no input source is available to the user.

Second Embodiment

Second Example of Input Source Search

Figure 11:
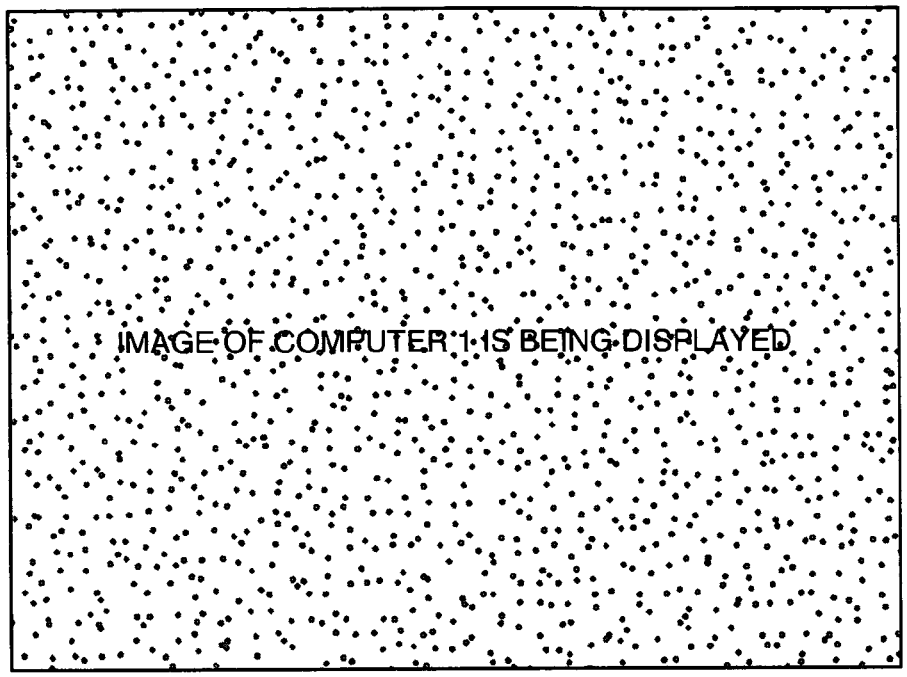
FIG. 11 shows an example of a display screen in a second embodiment.
Figure 12:
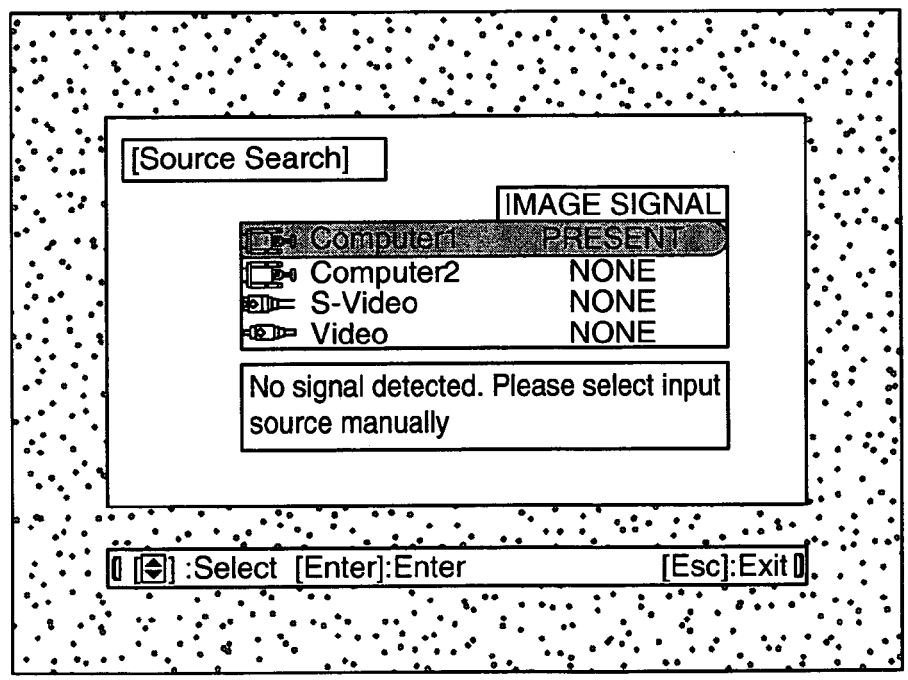
FIG. 12 shows an example of a display screen.
Figure 13:
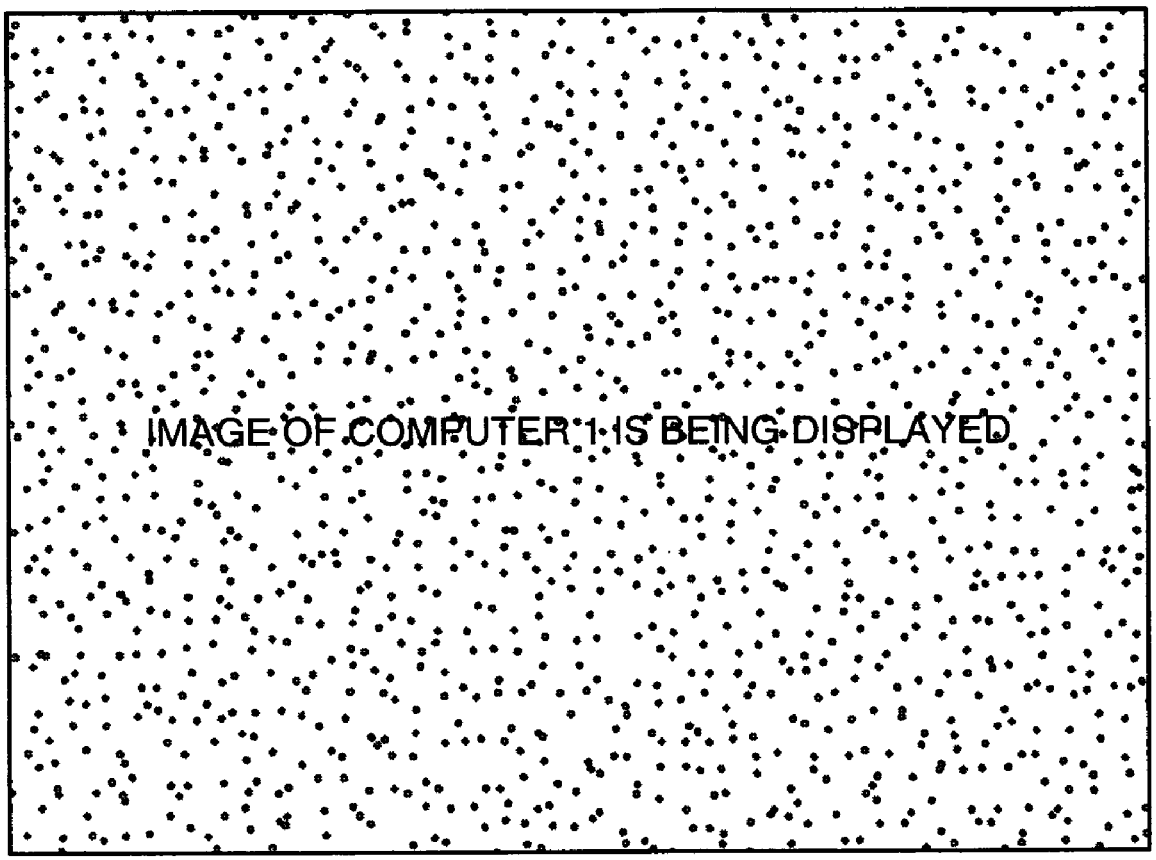
FIG. 13 shows an example of a display screen.

FIGS. 11 through 13 show examples of display screens in a second embodiment. FIG. 11 corresponds to FIG. 3 in the first embodiment, FIG. 12 corresponds to FIG. 7 in the first embodiment, and FIG. 13 corresponds to FIG. 9 in the first embodiment. The input source search support method in the second embodiment is a method for searching an input source different from the input source currently used by the projector 100 while the projector 100 is being operating.

The structure of the projector and the control programs stored in the storage section 67 and the like are similar to those of the projector 100 in the first embodiment.

The second embodiment is now explained referring to chiefly FIG. 2, and FIG. 1 and FIGS. 11 through 13 and other figures as supplementary figures, focusing on the differences from the first embodiment only.

In step S11, an image shown in FIG. 11 is displayed as the initial screen produced by image signals from the input source "Computer 1". The image provided by the input source "Computer 1" is shown by dots for simplification.

In step S13, the control section 66 commands the image signal correcting section 61 to generate image signals for producing the source search screen including the name of the input source corresponding to the initial input terminal and the indication that image signals have been inputted thereto, and project the corresponding image.

In step S24, the image of the input source "Computer 1" is displayed on the background of the "source search" screen as illustrated in FIG. 12. The size of the "source search" screen is smaller than the size of the image produced by the image signals from the input source "Computer 1".

When the processing for selecting any of the input sources is not executed within the predetermined time in step S25, the image of the input source "Computer 1" shown in FIG. 13 is displayed in step S28.

In other points, the input source search support method according to the second embodiment is similar to the input source search support method according to the first embodiment.

Accordingly, the following advantages are offered in the second embodiment in addition to the advantages provided in the first embodiment.

(1) When it is determined that image signals have been inputted to the initial input terminal and the input search processing is required through the remote controller 54, the control section 66 commands the image signal correcting section 61 to generate image signals for producing the source search screen including the input source name corresponding to the initial input terminal and the message that the image signals have been inputted before the input source search processing is conducted by the respective sections. Thus, even when image signals are detected in the initial input terminal, the projector 100 can display this information on the source search screen and then search for other input sources supplying image signals.

Accordingly, in the case where image signals have been inputted to the initial input terminal, the projector 100 can display the indication that image signals have been inputted thereto on the source search screen, and search for other input sources supplying image signals.

(2) When no image signal is inputted to the input terminals other than the initial input terminal, the control section 66 commands the input selector 56 to select the initial input terminal, and commands the image signal correcting section 61 to superpose the source search screen, which is smaller in size than the image produced by the image signals inputted from the initial input terminal, on the image signals inputted from the initial input terminal for a predetermined time. Thus, the projector 100 displays the source search screen for the predetermined time on the background of the image produced by the image signals inputted from the initial input terminal after completion of the search processing.

Accordingly, the projector 100 can display the source search screen while providing visual information showing that image signals have been inputted from the input source corresponding to the initial input terminal to the user using the background image produced by the image signals from the initial input terminal. Since the superposition of the source search screen finishes after elapse of the predetermined time, only the image produced by the image signals inputted from the initial input terminal can be displayed.

Third Embodiment

Third Example of Input Source Search

Figure 14:
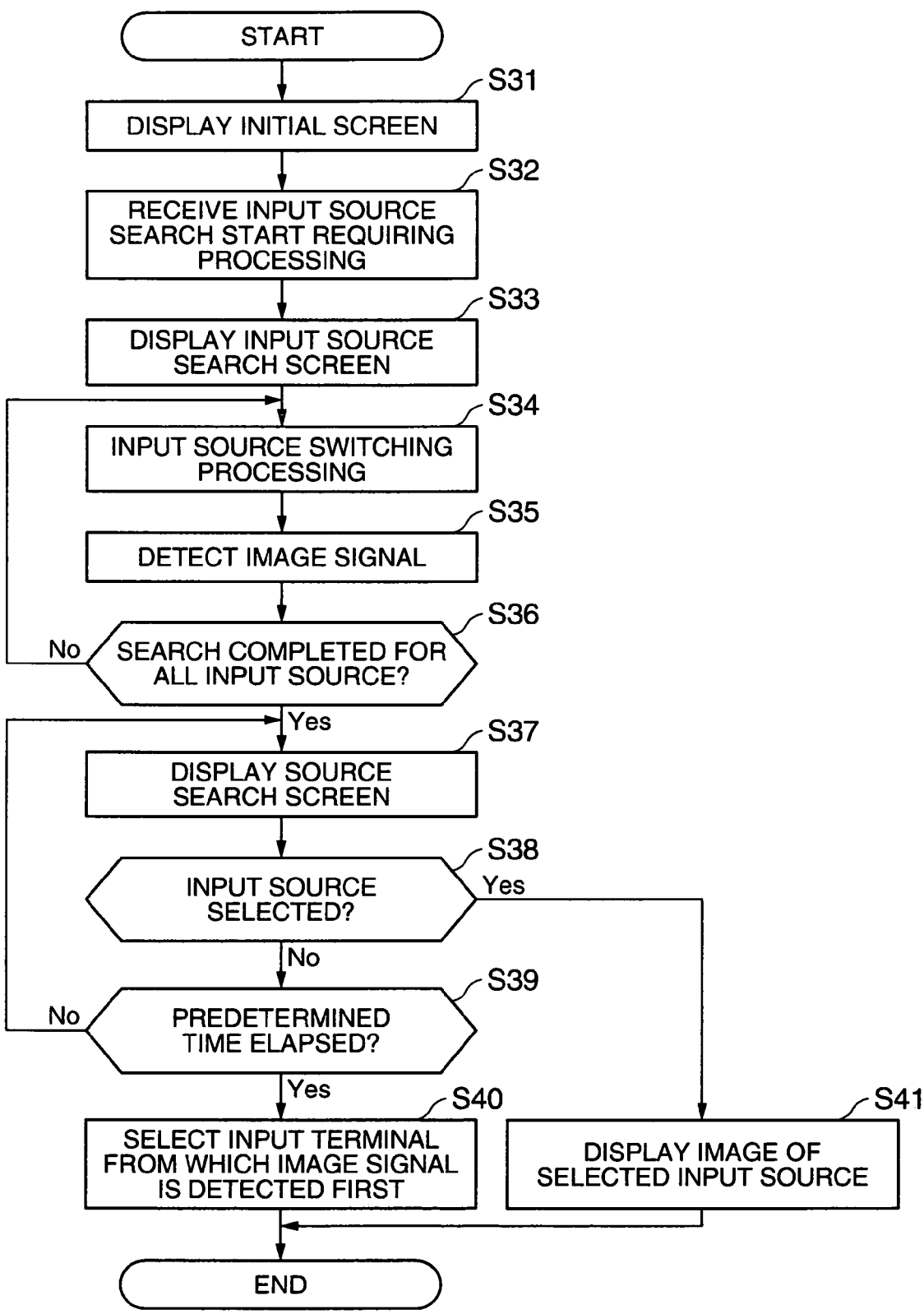
FIG. 14 is a flowchart showing an input source search support method in a third embodiment.

FIG. 14 is a flowchart showing an input source search support method in a third embodiment.

Figure 15:
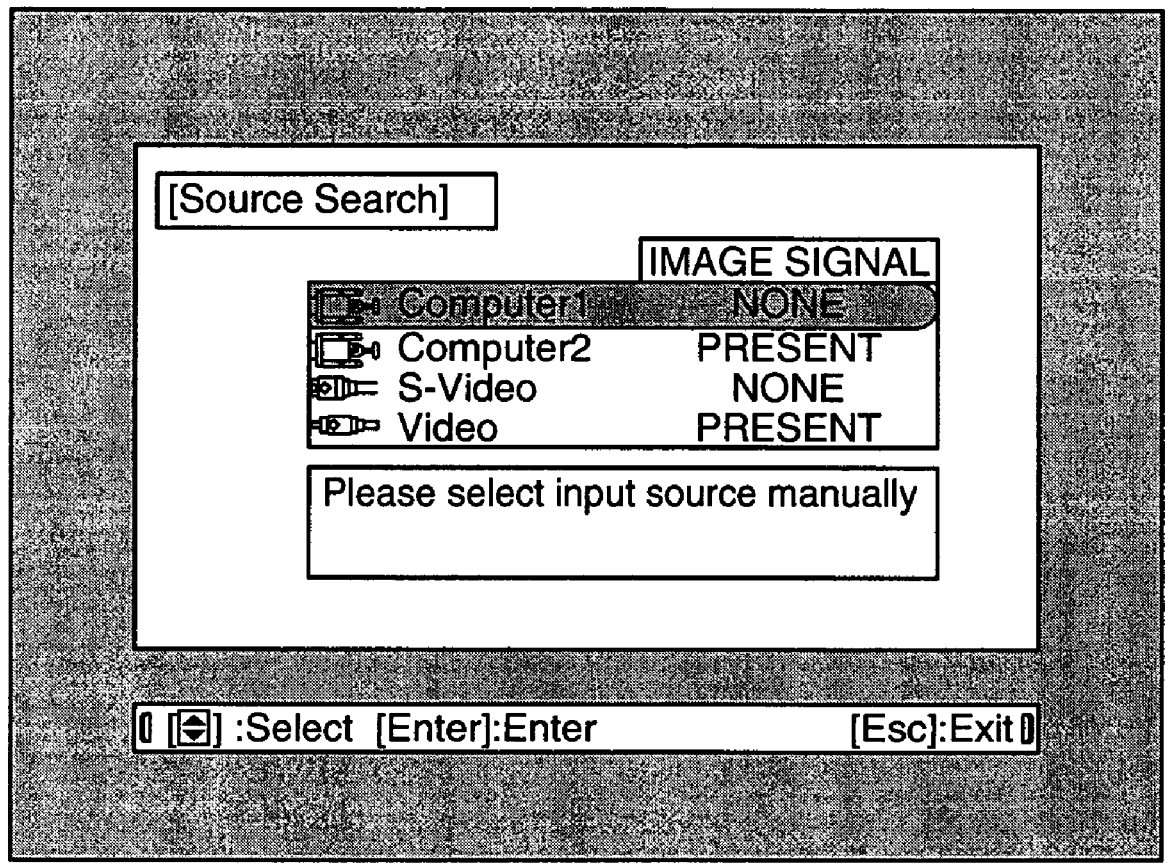
FIG. 15 shows an example of a display screen.
Figure 16:
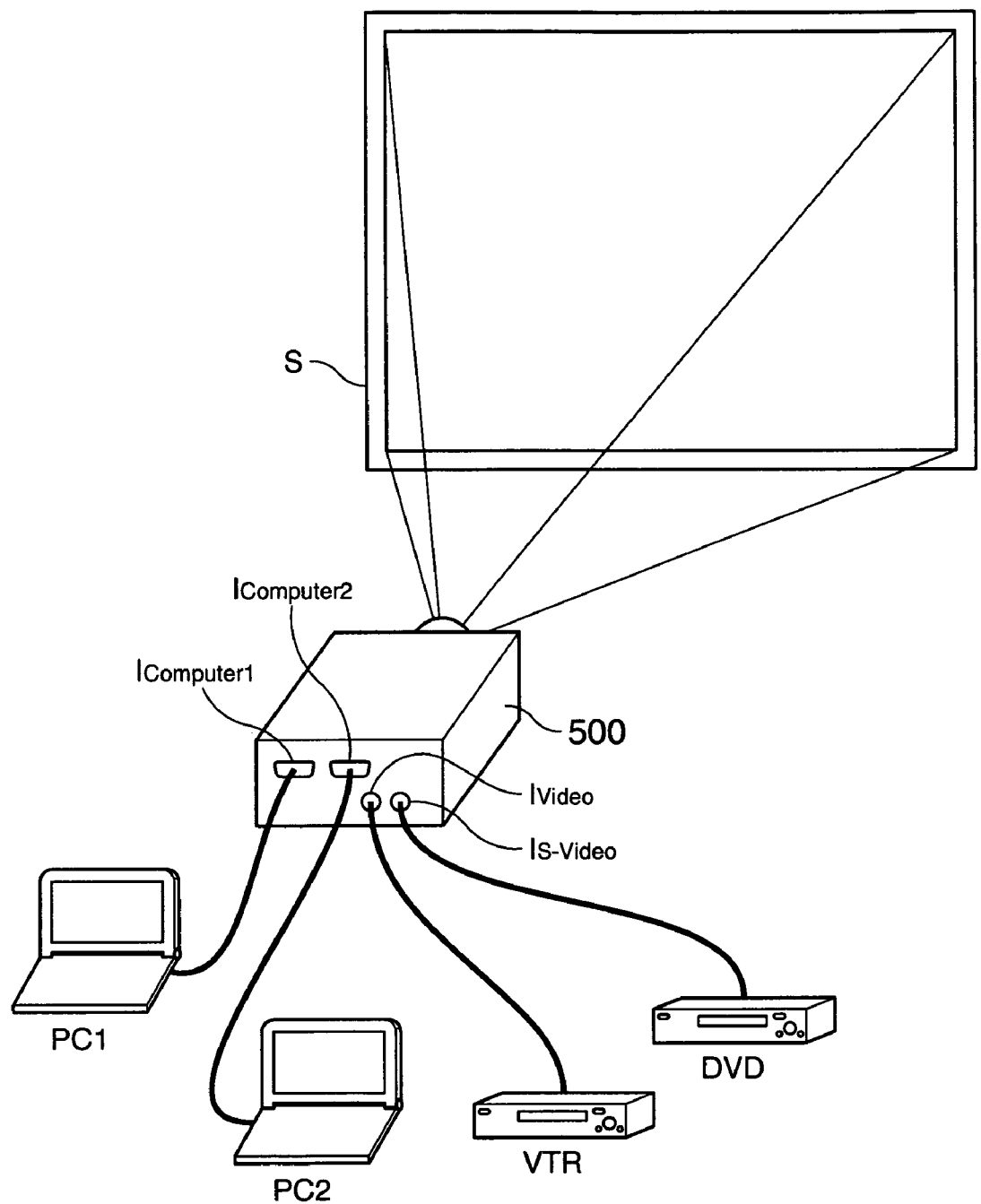
FIG. 16 illustrates a related-art projector to which a plurality of input sources are connected.
Figure 17:
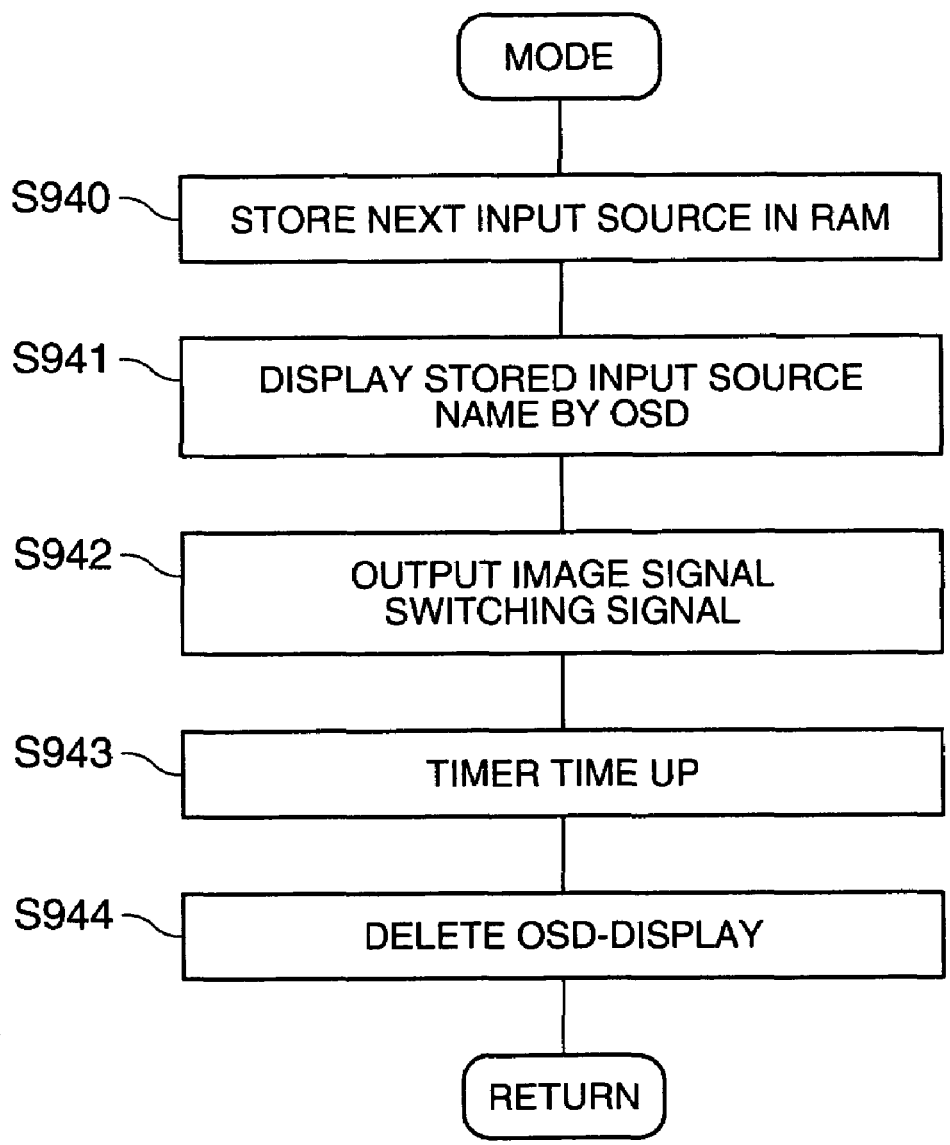
FIG. 17 shows a related-art input source search support method.
Figure 18:
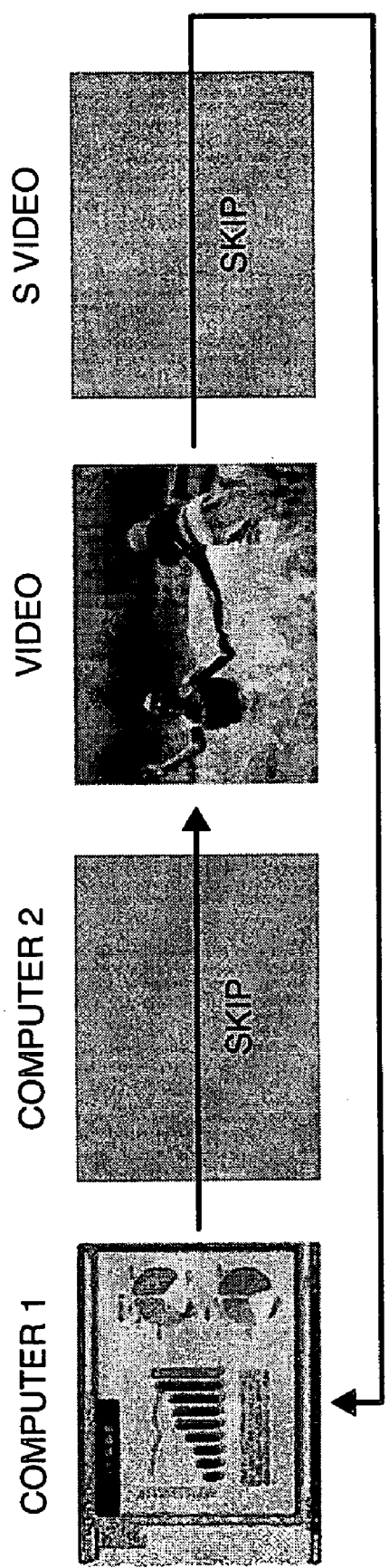
FIG. 18 illustrates another related-art input source support method.

FIG. 15 is an example of a display screen in the third embodiment.

The structure of the projector is similar to that of the projector 100 in the first embodiment.

Only the "source search program" stored in the storage section 67 of the projector 100 in the third embodiment is different from that of the projector 100 in the first embodiment.

In this embodiment, an example of the input source search executed by the projector 100 is described with reference to FIG. 14 chiefly, and also FIGS. 1 and 15 and other figures as supplementary figures.

When the "power source button" of the remote controller 54 is operated, operation signals are transmitted from the operation receiving section 55 to the control section 66. The control section 66 having received the operation signals starts and initializes the respective sections. The control section 66 commands the input selector 56 to select the input terminal T1 as the default input terminal. It is assumed that no image signal is outputted from the input source "Computer 1" at this stage.

In step S31, the control section 66 commands the image signal correcting section 61 to generate image signals for producing the "standby" screen shown in FIG. 3 based on the judging signals from the judging section 57 indicating that no image signal is inputted from the input source "Computer 1" corresponding to the input terminal T1, and commands the image signal correcting section 61 to project the corresponding image. The message saying "no image signal inputted" is displayed on the "standby" screen.

In step S32, the control section 66 receives operation signals from the operation receiving section 55 after the "source search button" of the operation section 53 is operated, and executes the "source search program" stored in the storage section 67. The operations performed by the respective sections in the following respective steps are carried out under the "source search program". The control section 66 stores the input terminal selected by the input selector 56 when search processing is required in the storage section 67 as the initial input terminal.

In step S33, the control section 66 commands the image signal correcting section 61 to generate image signals for producing the "source search" screen shown in FIG. 4 and project the corresponding image. The message "none" indicating that no image signal is inputted from the input source "Computer 1" is displayed on the "search source" screen in FIG. 4.

In step S34, the control section 66 commands the input selector 56 to select the next input terminal of the input terminal currently selected by the input selector 56 in the selection order. The selection order circulates as: "input terminal T1", "input terminal T2", "input terminal T3", "input terminal T4" and back to "input terminal T1".

In step S35, the control section 66 commands the judging section 57 to check the presence or absence of the image signals transmitted from the input source corresponding to the input terminal selected in step S34. The control section 66 also commands the storage section 67 to store the information on the presence or absence of the image signals for each of the checked input sources.

In the respective steps, the control section 66 commands the image signal correcting section 61 to update the "source search" screen in accordance with the search conditions one after another. The "source search" screen shown in FIG. 5 is a screen showing that the presence or absence of the image signals transmitted from the input source "Computer 2" corresponding to the input terminal T2 is being checked. This screen displays the message saying "now detecting signal status".

In step S36, the control section 66 checks whether image signals have been detected for all the input terminals T1 through T4. When detection is completed for all the input terminals, the flow advances to step S37. When detection is not completed for any input terminal, the flow returns to step S34.

In step S37, the control section 66 commands the image signal correcting section 61 to generate image signals for producing the "source search" screen shown in FIG. 15, and project the corresponding image. The "source search" screen in FIG. 15 includes a list indicating the presence or absence of inputted image signals for all the input sources. The "source search" screen displays the message saying "Please select input source manually".

In step S38, the control section 66 checks whether the "source selection button" of the operation section 53 or the remote controller 54 has been operated within a predetermined time from the presence or absence of the operation signals transmitted from the operation receiving section 55.

When the operation signals for selecting any of the input sources are detected, the flow proceeds to step S41. When the operation signals for selecting the input source are not detected, the flow goes to step S39.

In step S39, the control section 66 having displayed the "source search" screen shown in FIG. 15 in step S37 checks whether a predetermined time has elapsed. When it is determined that the predetermined time has elapsed, the flow proceeds to step S40. When it is still before elapse of the predetermined time, the flow returns to step S37 to continue the display of the "source search" screen. The predetermined time herein is approximately 10 seconds.

In step S40, the control section 66 commands the image signal correcting section 61 to close the "source search" screen. Then, the control section 66 reads out the input terminal corresponding to the input source from which the image signals have been detected first from the storage section 67, and commands the input selector 56 to select this input terminal. In the "source search" screen shown in FIG. 15, the input terminal T2 corresponding to the input source "Computer 2" from which image signals have been detected first is selected. As a result, the image produced by the image signals from the "Computer 2" shown in FIG. 8 is projected.

When it is determined as a search result in step S37 that no image signal is detected in any of the input sources as shown in FIG. 7, the control section 66 commands the image signal correcting section 61 to close the "source search" screen. Then, the control section 66 reads out the information on the initial input terminal from the storage section 67, and commands the input selector 56 to select this input terminal.

The processes to be performed when it is determined that the processing for selecting any of the input sources has been executed in step S38 are now discussed.

In step S41, the control section 66 commands the image signal correcting section 61 to close the "source search" screen, and commands the input selector 56 to select the input terminal corresponding to the input source selected in step S38.

The projector 100 can perform similar search processing even when it is determined that image signals have been inputted to the initial input terminal. The search processing executed when it is determined that image signals have been inputted to the initial input terminal is now explained focusing on the different points from the operation mentioned above only.

In step S31, the image shown in FIG. 11 produced by the image signals from the input source "Computer 1" is displayed as the initial screen.

In step S33, the control section 66 commands the image signal correcting section 61 to generate image signals for producing the source search screen including the input source name corresponding to the initial input terminal and the message showing that image signals have been inputted, and project this image.

In step S37, the image of the image source "Computer 1" is displayed as the background of the "source search" screen.

Accordingly, the following advantages can be offered in this embodiment.

(1) When search processing is required through the operation section 53, the control section 66 commands the input selector 56 to select the input terminals sequentially and commands the judging section 57 to check the presence or absence of inputted image signals for each of the selected input terminals. The control section 66 commands the image signal correcting section 61 to sequentially add the indication showing the presence or absence of image signals for each of the checked input terminals to the source search screen so as to check the presence or absence of the image signals for all the input terminals. Thus, the projector 100 checks the presence or absence of image signals for all the input terminals while adding the information on the presence or absence of image signals for each of the input terminals one after another, and displays a list showing the results on the source search screen.

Accordingly, the projector 100 can provide visual information on the checking status of the image signals to the user for each input source one after another, and efficiently notify the search results using the source search screen including the list which shows the presence or absence of the image signals for all the input terminals. Since the list on the source search screen showing the presence or absence of image signals for all the input sources allows the user to select the desired input source when image signals from the plural input sources are detected, the usability of the projector 100 is enhanced.

Therefore, the projector 100 can efficiently search for the input source which is outputting the image signals. When no image signal is inputted from any of the input sources, the projector 100 provides visual information on this fact to the user.

(2) When the processing for selecting any of the input sources is not executed through the operation section 53 within the predetermined time after the checking of the presence or absence of image signals is completed for all the input terminals, the control section 66 commands the image signal correcting section 61 to close the source search screen and commands the input selector 56 to select the input terminal from which image signals have been detected first. Thus, the projector 100 closes the source search screen and displays the image produced by the image signals from the input source corresponding to the input terminal from which the image signals have been detected first.

Accordingly, the projector 100 can efficiently search for the input source which is outputting the image signals, and automatically display the image produced by the image signals from this input source.

(3) Even in the case that image signals have been inputted to the initial input terminal, the projector 100 can execute search processing similar to the search processing in the case that no image signal is inputted to the initial input terminal and offer advantages similar to those provided in the case that no image signal is inputted thereto.

The scope of the invention is not limited to the embodiments described and depicted herein, but various modifications and improvements may be given to those. Modified examples within the scope of the invention are shown below.

Modified Example 1

This example is explained with reference to FIG. 1. The projector 100 in the above embodiments is a liquid crystal three-plate and projection type projector using the three liquid crystal light valves 52R, 52G and 52B as light modulation elements, but the projector according to the invention is not limited to this type.

For example, the projector may include a single-plate-type liquid crystal light valve which has red, green and blue color filters regularly arranged in a grid pattern and each of which is capable of emitting full-color modulated light. The projector also may be a reflection-type liquid crystal display device or contain a tilt mirror device.

In these structures, advantages similar to those in the above embodiments and modified example can be offered.

Modified Example 2

This example is explained with reference to FIG. 1. The input source search support method according to the invention is employed in the front-type projector 100 in the above embodiments and modified example. However, this method may be used in a rear-type projection TV, a liquid crystal TV, a plasma TV, a CRT TV, a PC monitor, an organic EL display, and other various image display apparatus.

Modified Example 3

This example is explained with reference to FIG. 1. The input sources are the four input sources of "Computer 1", "Computer 2", "S-Video", and "Video" in the above embodiments and the modified examples. However, a "component video" and a "digital video" may be added to those input sources, and input terminals, mini D-sub 15 pin terminals, and IEEE 1394 (Institute of Electrical and Electronic Engineers 1394) terminals corresponding to the respective input sources may be additionally equipped.

In structures using other input sources and input sources constituted by communication means such as the Internet, advantages similar to those in the above embodiments and modified examples can be offered.

What is claimed is:

1. An image display apparatus for displaying an image produced by image signals on a display section, comprising:
    a plurality of input terminals for receiving each of the image signals supplied from a plurality of input sources;
    an input selector for selecting a predetermined input terminal from the plural input terminals;
    a judging section for determining whether the image signals have been inputted to the input terminal selected by the input selector;
    an operating section which receives requirement of search processing for determining whether the image signals have been inputted to each of the plural input terminals;
    an image signal correcting section which generates image signals for producing a source search screen indicating search status for each of the input source names corresponding to the input terminals; and
    a control section for displaying an image of the source search screen produced by the image signals at least on the display section in response to search processing required through the operation section;
    the control section commanding the input selector to sequentially select the input terminals when the search processing is required through the operation section, and commanding the judging section to check the presence or absence of the image signals inputted for each of the selected input terminals;
    the control section commanding the image signal correcting section to add an indication for each of the plurality of input sources that no image signal is inputted to any of the sequentially checked input terminals when no image signal is inputted thereto;
    the control section commanding the image signal correcting section to close the source search screen when it is determined that the image signals have been inputted to any of the input terminals, and commanding the display section to display an image produced by the image signals from the input terminal from which the image signals have been detected;
    the image display apparatus further including a storage section for storing an initial input terminal selected by the input selector before the search processing is required; and
    the control section commanding the image signal correcting section to close the source search screen and commanding the input selector to select the initial input terminal stored in the storage section when it is determined that no image signal has been inputted to any of the input terminals and processing for selecting any of the input sources is not executed through the operation section within a predetermined time.

2. An image display apparatus according to claim 1:
    the control section commanding the image signal correcting section to close the source search screen when no image signal is inputted to any of the input terminals and processing for selecting any of the input sources is executed on the source search screen through the operation section; and
    the control section commanding the input selector to select the input terminal corresponding to the selected input source.

3. An image display apparatus according to claim 1, in the case that image signals have been inputted to the initial terminal selected by the input selector before the search processing is required, the control section commands the image signal correcting section to generate image signals for producing the source search screen including the input source name corresponding to the initial input terminal and the indication that image signals have been inputted to the initial input terminal in response to the search processing required through the control section before the respective sections perform operation corresponding to the search processing.

4. An image display apparatus according to claim 1, the control section commanding the image signal correcting section to superpose an indication that image signals are being detected on the source search screen while the judging section is checking the presence or absence of image signals for each of the selected input terminals.

5. An image display apparatus according to claim 1, the image display apparatus being a projector which modulates light emitted from a light source section into modulated light in accordance with the image signals using light modulating elements, and enlarging and projecting the modulated light using a projection lens.

6. An image display apparatus for displaying an image produced by image signals on a display section, comprising:
    a plurality of input terminals for receiving each of the image signals supplied from a plurality of input sources;
    an input selector for selecting a predetermined input terminal from the plural input terminals;
    a judging section for determining whether the image signals have been inputted to the input terminal selected by the input selector;
    an operating section which receives requirement of search processing for determining whether the image signals have been inputted to each of the plural input terminals;
    an image signal correcting section which generates image signals for producing a source search screen indicating search status for each of the input source names corresponding to the input terminals; and
    a control section for displaying an image of the source search screen produced by the image signals at least on the display section in response to search processing required through the operation section;
    the control section commanding the input selector to sequentially select the input terminals when the search processing is required through the operation section, and commanding the judging section to check the presence or absence of the image signals inputted for each of the selected input terminals;

the control section commanding the image signal correcting section to sequentially add an indication of the presence or absence of the image signals for each of the input terminals having been checked by the judging section on the source search screen so as to check the presence or absence of the image signals for all the input terminals; and the control section commanding the image signal correcting section to close the source search screen and commanding the input selector to select the input terminal from which image signals have been detected first when the processing for selecting any of the input sources is not executed through the operation section within a predetermined time after checking the presence or absence of image signals for all the input terminals.

7. An image display apparatus for displaying an image produced by image signals on a display section, comprising:

a plurality of input terminals for receiving each of the image signals supplied from a plurality of input sources;

an input selector for selecting a predetermined input terminal from the plural input terminals;

a judging section for determining whether the image signals have been inputted to the input terminal selected by the input selector;

an operating section which receives requirement of search processing for determining whether the image signals have been inputted to each of the plural input terminals;

an image signal correcting section which generates image signals for producing a source search screen indicating search status for each of the input source names corresponding to the input terminals; and a control section for displaying an image of the source search screen produced by the image signals at least on the display section in response to search processing required through the operation section;

the control section commanding the input selector to sequentially select the input terminals when the search processing is required through the operation section, and commanding the judging section to check the presence or absence of the image signals inputted for each of the selected input terminals;

the control section commanding the image signal correcting section to add an indication for each of the plurality of input sources that no image signal is inputted to any of the sequentially checked input terminals when no image signal is inputted thereto;

the control section commanding the image signal correcting section to close the source search screen when it is determined that the image signals have been inputted to any of the input terminals, and commanding the display section to display an image produced by the image signals from the input terminal from which the image signals have been detected; and the control section commanding the input selector to select the initial input terminal and commanding the image signal correcting section to superpose the source search screen, which is smaller than the image produced by the image signals inputted from the initial input terminal, on the image signals inputted from the initial input terminal for a predetermined time when no image signal is inputted to input terminals other than the initial input terminal.

8. An image display apparatus for displaying an image produced by image signals on a display section, comprising:

a plurality of input terminals for receiving each of the image signals supplied from a plurality of input sources;

an input selector for selecting a predetermined input terminal from the plural input terminals;

a judging section for determining whether the image signals have been inputted to the input terminal selected by the input selector;

an operating section which receives requirement of search processing for determining whether the image signals have been inputted to each of the plural input terminals;

an image signal correcting section which generates image signals for producing a source search screen indicating search status for each of the input source names corresponding to the input terminals; and a control section for displaying an image of the source search screen produced by the image signals at least on the display section in response to search processing required through the operation section;

the control section commanding the input selector to sequentially select the input terminals when the search processing is required through the operation section, and commanding the judging section to check the presence or absence of the image signals inputted for each of the selected input terminals;

the control section commanding the image signal correcting section to add an indication for each of the plurality of input sources that no image signal is inputted to any of the sequentially checked input terminals when no image signal is inputted thereto;

the control section commanding the image signal correcting section to close the source search screen when it is determined that the image signals have been inputted to any of the input terminals, and commanding the display section to display an image produced by the image signals from the input terminal from which the image signals have been detected; and in the case that the source search screen is closed and that image signals have not been inputted to the input terminal selected by the input selector in response to the operations by the respective sections based on the search processing or to the selecting processing through the operation section, the control section commanding the image signal correcting section to generate image signals for producing a screen showing the selected input source name and an indication that image signals have not been inputted on the display section.

* * * * *